US011445245B2

(12) United States Patent
Einaudi et al.

(10) Patent No.: US 11,445,245 B2
(45) Date of Patent: Sep. 13, 2022

(54) SYNCHRONIZED COMBINATIONS OF CAPTURED REAL-TIME MEDIA CONTENT WITH PLAYED-BACK DIGITAL CONTENT

(71) Applicant: Caavo Inc, Milpitas, CA (US)

(72) Inventors: Andrew E. Einaudi, San Francisco, CA (US); Ashish D. Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 17/336,533

(22) Filed: Jun. 2, 2021

(65) Prior Publication Data

US 2021/0385531 A1  Dec. 9, 2021

Related U.S. Application Data

(60) Provisional application No. 63/034,213, filed on Jun. 3, 2020.

(51) Int. Cl.
*H04N 21/44* (2011.01)
*H04N 21/43* (2011.01)

(52) U.S. Cl.
CPC . *H04N 21/44016* (2013.01); *H04N 21/43072* (2020.08); *H04N 21/44004* (2013.01); *H04N 21/44008* (2013.01)

(58) Field of Classification Search
CPC ....... H04N 21/44016; H04N 21/43072; H04N 21/44004; H04N 21/44008
See application file for complete search history.

(56) References Cited

U.S. PATENT DOCUMENTS 6,585,521 B1* 7/2003 Obrador ................. G09B 19/00
2020/0364462 A1* 11/2020 Imes ....................... G06K 9/00

* cited by examiner

*Primary Examiner* — Anthony Bantamoi
(74) *Attorney, Agent, or Firm* — Fiala & Weaver P.L.L.C.

(57) ABSTRACT

Methods, systems, and apparatuses are described for sharing content viewed by a user. Multimedia content may be presented by an output device to an audience. A selection of a portion of the multimedia content is selected for sharing by an audience member. Additionally, synchronized combinations of captured real-time media content with played-back digital content are generated by systems and devices. A media content stream from a source device that is to be played back by a sink device is buffered. Messages pertaining to the capture of a first media clip are received from a media capture device, and based on the messages, a portion of the buffered content stream is identified and extracted to generate a second media clip. Combined media content is generated by combining the first and the second media clips, and the combined media content is stored for later playback and sharing.

20 Claims, 9 Drawing Sheets

SYNCHRONIZED COMBINATIONS OF CAPTURED REAL-TIME MEDIA CONTENT WITH PLAYED-BACK DIGITAL CONTENT

CROSS-REFERENCE TO RELATED APPLICATIONS

This application claims priority to U.S. Provisional Application Ser. No. 63/034,213, entitled "Synchronized Combinations of Captured Real-Time Media Content with Played-Back Digital Content," filed on Jun. 3, 2020, the entirety of which is incorporated by reference herein.

BACKGROUND

Sharing video and other content with others is becoming increasingly popular. Web sites that enable content to be shared by others (e.g., YouTube®, Facebook®, etc.) are also becoming quite popular. However, the content that is shared is generally limited to content that is generated/recorded by the user himself, for example, using a camera on a smartphone. This content may also be shared via messaging applications.

A typical home entertainment system may consist of a variety of different multimedia devices, such as a television (TV), a cable/satellite set-top box (STB), video game consoles such as Xbox™ or Playstation™, media streaming devices, such as Roku™, AppleTV™, Chromecast™, and a host of other devices, such as Blu-ray™ players, digital video disc (DVD) and compact disc (CD) players. Very often, these devices are connected through an audio-video receiver (AVR). Typically, a user shares multimedia content by sharing the physical storage (DVDs, CDs) on which the multimedia content is stored.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present subject matter relates to methods, systems, and apparatuses for sharing multimedia content and generating combined content. Methods, systems, and apparatuses are described for sharing content viewed by a user. Multimedia content may be presented by an output device to an audience. A selection of a portion of the multimedia content is selected for sharing by an audience member. Information associated with the portion of the multimedia content is automatically determined. A selection is received of one or more users with which to share the portion of the multimedia content. A user-interactive identifier, the determined information, and/or the portion of the multimedia content are transmitted to the selected user(s). The user-interactive identifier is configured to enable the multimedia content to be accessed by the one or more selected users. Methods, systems, and apparatuses are also described for generating combined media content. A media content stream from a source device that is to be played back by a sink device is buffered. Messages pertaining to the capture of a first media clip are received from a media capture device, and based on the messages, a portion of the buffered content stream is identified and extracted to generate a second media clip. Combined media content is generated by combining the first and the second media clips, and the combined media content is stored for later play-back and sharing.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements.

Figure 1:
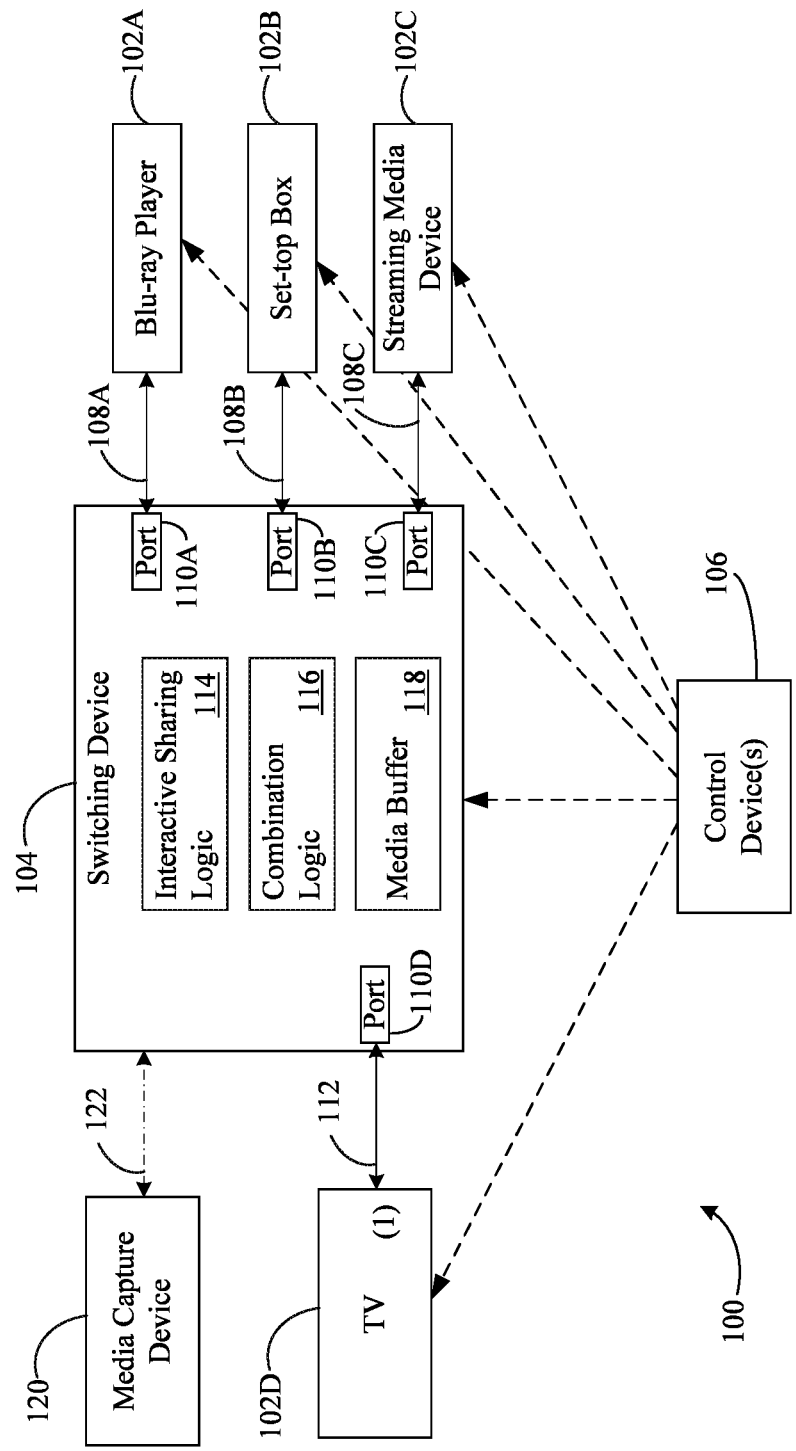
FIG. 1 is a block diagram of a system that is configured to enable the generating of combined multimedia content and the sharing of multimedia content provided by a plurality of electronic devices in accordance with an embodiment.

Additionally, the left-most digit(s) of a reference number identifies the drawing in which the reference number first appears.

DETAILED DESCRIPTION

Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

As used herein, the term "media content refers" at least to video content, audio content, and audio/video content, including multimedia content. The term "multimedia content" may also be used to refer to media content in embodiments for consistency, and these terms may be used interchangeably unless specified otherwise.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

EXAMPLE EMBODIMENTS

Sharing video and other content with others continues to become increasingly popular, such as via messaging and social media. However, the content that is shared is generally limited to content that is generated/recorded by the user themselves, for example, using a camera on a smartphone. Despite advances in technology, it continues to be difficult to share other content, such as multimedia content, accessed on a home entertainment system. Additionally, the sharing of user experiences and reactions when consuming content is limited by capture via user device in a single clip.

For instance, a typical home entertainment system may consist of a variety of different multimedia devices, such as a television (TV), a cable/satellite set-top box (STB), video game consoles such as Xbox™ or Playstation™, media streaming devices, such as Roku™, AppleTV™, Chromecast™, and a host of other devices, such as Blu-ray™ players, digital video disc (DVD) and compact disc (CD) players. Very often, these devices are connected through an audio-video receiver (AVR). However, sharing content (e.g., multimedia content viewed previously or currently being viewed) on any of the connected devices with another user is overly cumbersome. For example, a user may need to stop watching the multimedia content, manually initiate a message or an email to another user, compose a message identifying the multimedia content, and transmit the message to the other user. Furthermore, there is no way to attach a portion of the actual multimedia content (e.g., a video or an image) to the user's message, resulting in a message that is typically limited to a text-only message entirely composed by the user. Moreover, user captured video does not itself identify the content consumed, nor does user captured video present the consumed content in its played-back quality.

Example embodiments described herein enable a user to share content with another user, as well as to generate combined content from real-time, captured media clips and portions of played back multimedia content. In embodiments, multimedia content may be presented/played-back by an output device (e.g., a streaming media player, a set-top box, etc.). A portion of the multimedia content may be selected for sharing (e.g., with another user). In other embodiments, captured real-time media clips associated with a portion of played-back multimedia content (e.g., by temporal identifiers, timestamps, audio channel matching, etc.) are combined and stored/shared. Information associated with the multimedia content may be further determined (e.g., metadata, a service or source device providing the content, a time, an identification of the content, etc.). Upon submission of a selection to share the multimedia content or an identification of a portion of played-back multimedia content with which a captured real-time media clip is combined, a user-interactive identifier (e.g., a hyperlink) and information and/or content may be transmitted to enable the receiving user to access the content, view information related to the content, etc. In this manner, recorded and combined content may be easily and quickly shared with another user with relatively low user effort. In embodiments, the user-interactive identifier may designate (either automatically or by the user) a subscription and/or service via which the content can be consumed; in automatically designated embodiments, a service associated with a switching device may look up the other user's subscriptions/services available and populate the user-interactive identifier accordingly without the originating user having access to the other user's details.

Accordingly, techniques are described herein that enable a user to share a short video or audio clip of content that the user is watching (e.g., via live television (TV)) or listening to, share an image, share a snap shot and/or animated Graphics Interchange Format (GIF) of the content, and/or share metadata information about the content in the form of an accessible address such as a uniform resource locator (URL) (e.g., a hyperlink) such that the receiving party (e.g., another user) can navigate to the address (e.g., click on the hyperlink) and watch the content. Additionally, techniques are described herein to generate combined media content from captured real-time media clips and buffered multimedia content, which can also be shared. In accordance with an embodiment, the user may be enabled to carry out the aforementioned techniques for sharing media content by interacting with an interface element (e.g., a button) of a control device or a smartphone (e.g., as a media capture device), or via a voice command, thereby enabling the user to share content viewed or listened to by the user with a press of a button or a short voice command. In accordance with another embodiment, the user may be enabled to carry out the aforementioned techniques for generating combined media content by interacting with an interface element (e.g., a button) of a control device or a smartphone (e.g., as a media capture device), or via a voice command, thereby enabling the user to capture real-time media content like a video clip with a press of a button or a short voice command and cause automatic identification of buffered multimedia content being played-back for combining thereof. Additionally, a media capture device may be configured to automatically initiate real-time capture and identification of buffered multimedia content being played-back based on a determination of user emotion or response to the multimedia content being played-back.

For example, a user may be watching a football game, and may witness an interesting play (e.g., a touchdown, a fumble, an interception, etc.) that the user would like to share with another user or which causes a reaction from the user. In accordance with techniques described herein, the user may interact with a switching device (e.g., by pressing a button on the control device, a smartphone, or a media capture device, or issuing a voice command) that would enable the user to record, identify, and/or share the last N seconds, minutes, etc. of content watched (which is being continuously recorded). In embodiments, a media capture device also captures a media clip associated with the portion of the content that user finds interesting or reacts to, and the corresponding buffered portion thereof are identified for combining. In another embodiment, a user may press and hold an interface element (e.g., a button) on a control device a smartphone, or a media capture device, to cause a user-defined time period of content currently being watched to be recorded, combined, and/or shared.

The user may also interact with the switching device to share a user-interactive identifier, information associated with the recorded content, and/or the recorded content with one or more other users. In embodiments, the user may further select which portions (e.g., which portions of the last N seconds, minutes, etc. or of the user-defined time period), of the recorded content the user would like to share with another user, such as by interacting with a video editor in a graphical user interface (GUI). In some embodiments, the user-interactive identifier is generated automatically.

FIG. 1 is a block diagram of a system 100 that is configured to automatically setup and control a plurality of electronic devices 102A-102D and content provided thereby and/or played back thereon. As shown in FIG. 1, system 100 includes electronic devices 102A-102D, a switching device 104, and one or more control device(s) 106. As illustrated, system 100 also includes combination logic 116, a media buffer 118, and a media capture device 120.

In embodiments, system 100 may be an exemplary operating environment for the techniques described herein to share multimedia content with one or more other users. Techniques in accordance with embodiments discussed herein are not, however limited to system 100. Other exemplary operating environments in which embodiments discussed herein may be carried out include other types of switching device (e.g., an audio/video receiver, high definition multimedia interface (HDMI) switch, etc.), a set-top box, a desktop computer, a laptop, a tablet, a smart phone, a personal data assistant, etc. In accordance with an embodiment, the techniques described herein may be integrated with a display device (e.g., a television, a monitor, a projector, and/or the like). System 100 is described as follows.

Electronic devices 102A-102C are configured to provide audio and/or video signals (e.g., audio and/or video signals 108A, 108B, 108C, respectively) for playback and are referred to as "source" devices. Electronic device 102D is configured to receive audio and/or video signals (e.g., audio and/or video signals 112) and is referred to as a "sink" device. As shown in FIG. 1, electronic device 102A is coupled to a first AV port 110A of switching device 104, electronic device 102B is coupled to a second AV port 110B of switching device 104, electronic device 102C is coupled to a third AV port 110C of switching device 104, and electronic device 102D is coupled to a fourth AV port 110D of switching device 104. In accordance with an embodiment, AV ports 110A-110D are High Definition Media Interface (HDMI) ports. However, embodiments described herein are not so limited. As further shown in FIG. 1, electronic device 102A is a Blu-ray player, electronic device 102B is a set-top box (STB) (e.g., a device used to access a cable TV feed, a satellite TV feed, an antenna-based TV feed, etc.), electronic device 102C is a streaming media device, and electronic device 102D is a TV. Examples of a streaming media device include, but are not limited to, Internet streaming devices such as a Roku™ device, an AppleTV™ device, a Chromecast™, and/or the like. Streaming media devices may further playback content from a plurality of content sources, such as any one of a number of Internet streaming services (e.g., Netflix®, Hulu®, HBO Go®, etc.). The depiction of these particular electronics devices is merely for illustrative purposes. It is noted that while FIG. 1 shows that switching device 104 includes four AV ports 110A-110D, switching device 104 may include any number of AV ports, and therefore, may be coupled to any number of electronic devices.

Switching device 104 is configured to select (e.g., switch between) different audio and/or video source devices that are coupled to AV ports 110A-110C (e.g., electronic device 102A, electronic device 102B or electronic device 102C) and provide an output signal (e.g., audio and/or video signals 112) comprising audio and/or video signals (e.g., audio and/or video signals 108A, audio and/or video signals 108B or audio and/or video signals 108C) provided by the selected audio/video source. Audio and/or video signals 112 are provided to electronic device 102D through AV port 110D. Audio and/or video signals 112 may also be provided to any other device capable of playing back audio and/or video signals (e.g., speakers) that may be coupled to AV port 102D and/or other port(s) (not shown) of switching device 104.

Each of AV ports 110A-110D may be configurable to be coupled to either a source device (e.g., electronic device 102A, electronic device 102B, or electronic device 102C) or a sink device (e.g., electronic device 102D). For example, switching device 104 may be configured to automatically determine whether an electronic device coupled to a particular AV port is a source device or a sink device. Based on that determination, switching device 104 may configure that AV port to be a source AV port or a sink AV port. Additional details regarding the auto-configuration of AV ports 110A-110D is described below in Subsection A.

Switching device 104 may also be configured to automatically identify (e.g., determine) the electronic device coupled to each of AV ports 110A-110D. For example, for each electronic device coupled to a particular AV port, switching device 104 may be configured to determine one or more identifiers of the electronic device, such as, but not limited to, a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. The identifier(s) may be determined according to various techniques, such as, but not limited to: techniques based on HDMI consumer electronics control (CEC), identification via video data, identification via audio data, identification via IP network, determination by remote control operation by a user, identification via voice input from a user, and identification via explicit device selection by a user. Upon determining the identifier(s), switching device 104 may be configured to map the identified electronic device to the AV port to which that electronic device is connected. This process may be referred to as "device-to-port mapping." Additional details regarding device-to-port mapping is described below in Subsection B.

Switching device 104 may be further configured to automatically select or switch between AV ports 110A-110C based on determining which electronic device(s) a user would like to use for providing and/or presenting content.

Control device(s) 106 may be operable to control any or all of electronic devices 102A-102D and/or switching device 104. Control device(s) 106 may include a display screen and/or one or more physical interface elements (e.g., buttons, sliders, jog shuttles, etc.). In accordance with an embodiment, the display screen (or a portion thereof) may be a capacitive (or other type) touch display screen. The display screen may be configured to display one or more virtual interface elements (e.g., icons, buttons, search boxes, etc.). The display screen may be configured to enable a user to interact, view, search, and/or select content for viewing via any of electronic device 102A-102D and switching device 104. In embodiments, control device(s) 106 may comprise a smart phone, tablet computer, wearable computing device, and/or any other type of computing device by which a user may interface with switching device 104. In some embodiments, an application (or "app") associated with switching device 104 (including services therefor) and installed at and executed by control device(s) 106 may provide a user interface by which embodiments are performed and/or carried out.

In accordance with an embodiment, control device(s) 106 may be operable to control any or all of electronic devices 102A-102D by transmitting control signals thereto. In embodiments, control signals may be transmitted via any suitable type of radio-frequency (RF) communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.), and/or the like. In accordance with embodiment, control signals may also be transmitted via other types of communication protocols, such as via an infrared (IR) signal utilizing an IR protocol. In embodiments, control device(s) 106 may be configured to provide commands and/or messages associated with generating synchronized combinations of captured real-time media content with played-back digital content.

In accordance with techniques described herein, switching device 104 further includes interactive sharing logic 114. As described in greater detail below in Subsection C, interactive sharing logic 114 may enable the sharing of a user-interactive identifier, information associated with multimedia content, and/or the multimedia content provided by one of the output devices connected to port(s) 110A-110C to another user.

As noted above for the illustrated embodiment of system 100, switching device 104 includes combination logic 116 and media buffer 118. Media buffer 118 is configured to automatically store a predetermined length of multimedia content viewed or played back by a sink device for display to a user. Media buffer 118 comprises one or more buffers in embodiments that may comprise any type of memory for storing multimedia content provided to switching device 104 from source devices. Media buffer 118 is described in further detail below. Combination logic 116 is configured to combine or synchronously combine, combinations of captured real-time media content with played-back digital content, in accordance with embodiments. For example, combination logic 116 may be configured to combine a buffered portion or clip of media/multimedia content to be played-back for display by a user with a clip of media/multimedia captured by media capture device 120. In some embodiments, the captured clip comprises media/multimedia recordings of a user(s) and their reactions to the buffered clip—i.e., the two clips may are temporally related or matching in real time, in embodiments. In embodiments, combination logic 116 is configured to combine respective media clips from one or more instances of media capture device 120, with a buffered portion or clip of media/multimedia content to be played-back, into a single combined media content file and/or into multiple files of combined media content. Combination logic 116 is described in further detail below.

Media capture device 120 is configured to capture media/multimedia clips, e.g., video, audio, or audio/video clips. In embodiments, the captured media/multimedia clips are related to a user that is viewing media/multimedia from a source device, provided to switching device 104, and played back by a sink device, as described herein. Media capture device 120 may comprise one or more of a smartphone having a camera and/or microphone, an artificial intelligence (AI) camera with or without a microphone, a stand-alone digital camera with or without a microphone, a wearable digital camera with or without a microphone, and/or the like. In embodiments, multiple instances of media capture device 120 are present and each one performs the functions and operations described herein for a single instance thereof. For example, a user may utilize two media capture devices 120 to capture two real-time media clips of reactions, from different perspectives, to content being played-back via switching device 104, and both of these captured media clips may be combined together with the played-back content in one combined media content file. Similarly, a user of switching device 104 may use their own media capture device 120 and also allow another user's media capture device 120 to both capture real-time media clips to be combined with the played-back content. Media capture device 120 may comprise a portion of switching device 104 and/or any sink and/or source device as described herein. Media capture device 120 may comprise a device or portion of a device of control device(s) 106, in embodiments. Accordingly, media capture device 120 may be local to, or co-located with, switching device 104 and/or other components of system 100—that is media capture device 120 may be part of a device or component of system 100, be in the same room as system 100, in the same building or otherwise at the same location of system 100 such that local communications between media capture device 120 and other components of system 100 are possible.

In other embodiments, media capture device 120 may be located remotely with respect to components of system 100 and communicate therewith via an external network such as, but without limitation, via a cellular modem over a cellular network, over a satellite network, over another type of external network, over the Internet, etc. In this way, a user is enabled to realize the embodiments herein for generating combined media content regardless of their location relative to switching device 104, e.g., capturing real-time media clips associated with an event or broadcast or the like, which may be also recorded by switching device 104, e.g., concurrently with the capturing. For instance, a user of switching device 104 may designate media/multimedia content to be recorded or buffered in association with switching device 104 even when the user will not be present to consume the played-back media/multimedia content (e.g., the user is located remote to switching device 104—the user may watch the media/multimedia content at a friend's house, at a sports bar, at a sporting event, at a location outside of near-field or local area network range, at a geographic location that is more than a given distance from switching device 104 (e.g., 50 m, 100 m, or more) etc.). And while the user is not present, i.e., is located remote to switching device 104, media capture device 120 is nevertheless able to capture a real-time media clip of the user when watching the media/multimedia content remotely and provide messages and/or the captured real-time media clip to switching device 104 for generating combined media content, as described herein. Media capture device 120 may include artificial intelligence that is configured to determine a user(s) emotions or reactions to played-back content for the purposes of initiating and/or finishing real-time capture of media clips, in embodiments, including video and/or audio detection via a camera and/or a microphone, respectively (and such emotions or reactions to played-back content may also be used for updated profile preferences of users and subsequently recommending media/multimedia content as described below). Accordingly, media capture device 120 is configured to communicate with switching device 104 via any wired or wireless connection, shown as a connection 122, and having a corresponding wired or wireless adapter (not shown for brevity) in different embodiments, and may include a connection to a port as described herein. In some embodiments, capture of media clips may be stored at a media capture device and later provided to a multimedia device, e.g., switching device 104.

In embodiments, interactive sharing logic 114 and combination logic 116 may be combined, in whole or in part, as one component.

A. Automatic Configuration of AV Ports

Figure 2:
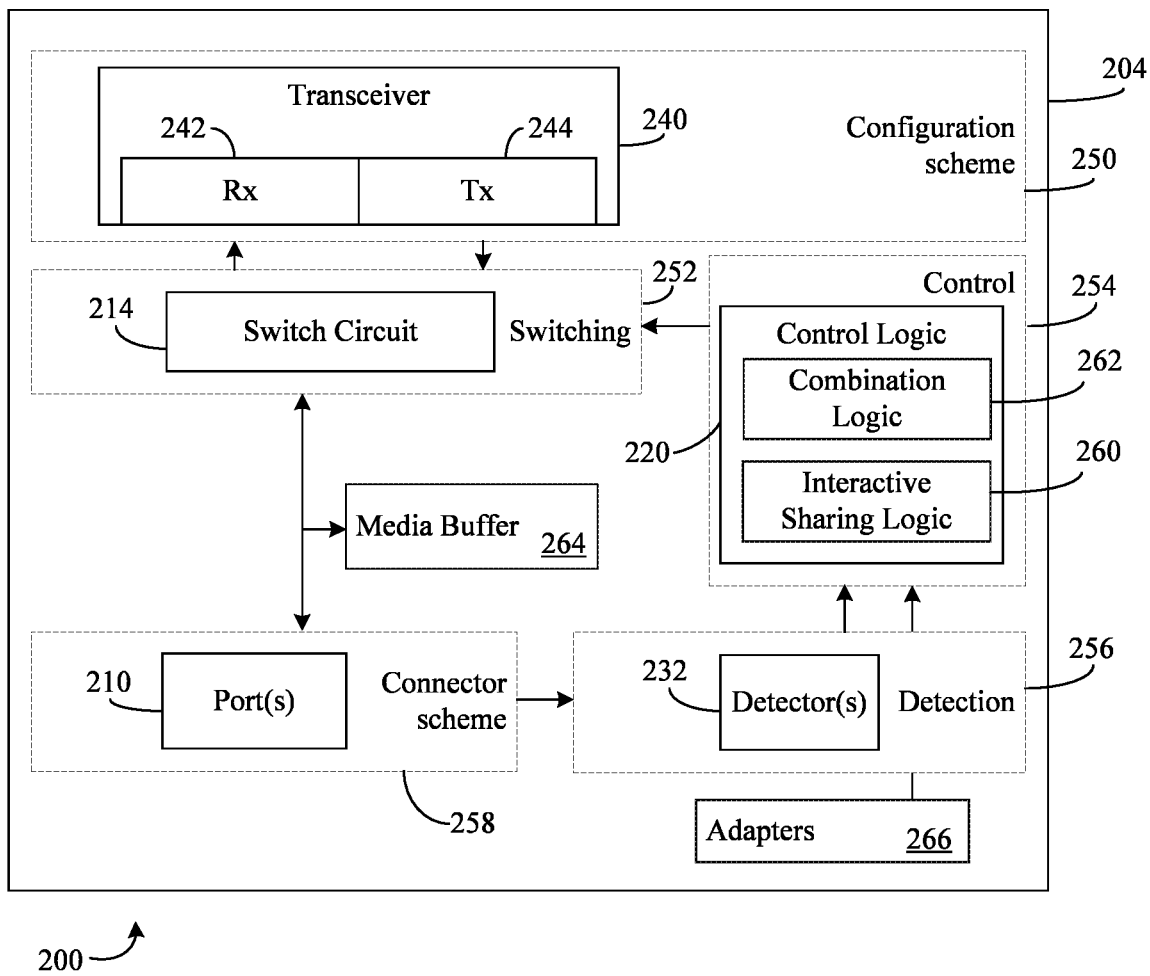
FIG. 2 is a block diagram of system that includes a switching device configured to enable the generating of combined multimedia content and the sharing of multimedia content, enabling one or more audio/video (AV) port(s) to be coupled either to a source device or a sink device in accordance with an embodiment.

FIG. 2 is a block diagram of a system 200 that includes a switching device 204 that is configured to automatically configure audio/video (AV) port(s) to be coupled either to a source device or a sink device in accordance with an embodiment. Switching device 204 is an example of switching device 104, as described above in reference to FIG. 1. Switching device 204 may include a number of sub-schemes according to embodiments: a configuration scheme 250, a switching scheme 252, a control scheme 254, a detection scheme 256, and a connector scheme 258. According to various embodiments, the sub-schemes shown may be combined with each other, separated into multiple components, etc.

Connector scheme 258 includes one or more AV ports 210 (also referred to as AV connectors). In accordance with an embodiment, AV port(s) 210 are configured to accept HDMI connections from HDMI enabled devices, such as HDMI sink devices and HDMI source devices. According to embodiments, any AV port of AV port(s) 210 may accept a sink device or a source device. While not shown for illustrative clarity, a typical signal conditioning scheme may also be retained to meet the strict compliance requirements for the standard used to implement AV port(s) 210 (e.g., an HDMI standard in an embodiment where AV port(s) 210 are HDMI AV port(s)).

Configuration scheme 250 includes a transceiver 240 that includes an input component RX 242 and an output component TX 244. Transceiver 240 is configured to receive audio and/or video signals at input component RX 242 and to transmit audio and/or video signals from output component TX 244. In other words, transceiver 240 provides received input audio and/or video signals from source devices as output audio and/or video signals to sink devices, in accordance with the embodiments herein. It is also contemplated herein that one or more of input component RX 242 and/or an output component TX 244 may be included in transceiver 240 in various embodiments.

Detection scheme 256 may include one or more detectors 232 that are configured to detect indicia of operational modes to determine a type of an electronic device (e.g., an HDMI-enabled device) connected to AV port(s) 210 (i.e., whether the electronic device is a source or a sink). In embodiments, detectors 232 may be configured to make such a detection/determination based on signals received from AV port(s) 210.

Control scheme 254 may include control logic 220 that is configured to receive the detected indicia or signals based thereon from detectors 232 and use the received information to control one or more aspects of switching scheme 252, such as one or more switches included therein. In accordance with techniques described herein, control logic 220 includes interactive sharing logic 260, which is an embodiment of interactive sharing logic 114 described above with reference to FIG. 1, as well as combination logic 262, which is an embodiment of combination logic 116 described above with reference to FIG. 1. As described below in Subsection C, interactive sharing logic 260 enables the sharing of a user-interactive identifier, information associated with multimedia content, and/or a portion of the multimedia content provided by one of the output devices connected to port(s) 210 to another user, and combination logic 262 described below may be configured to work in conjunction with interactive sharing logic 260 to share generated synchronized combinations of captured real-time media content with played-back digital content.

Switching scheme 252 includes switch circuit 214. Switch circuit 214 may be configured to provide switched connections between AV port(s) 210 and transceiver 240. That is, switch circuit 214 may provide a connection between any AV port of AV port(s) 210 and any receiver (e.g., input component RX 242) or transmitter (e.g., output component TX 244) of transceiver 240. Switch circuit 214 may comprise one or more switch circuit portions and may be combined or used in conjunction with other sub-schemes of switching device 204.

Therefore, there is no need to pre-define the function of any port of AV port(s) 210. That is, AV port(s) 210 can be configured either as inputs or outputs. Additionally, detector(s) 232 are configured to detect the type of electronic device (i.e., a source device or a sink device) connected to an AV port of AV port(s) 210 and provide this information as input to control scheme 254, which may then issue appropriate commands to switch circuit 214 to either connect to input component RX 242 or output component TX 244 of transceiver 240. Thus, the same AV port can act as an input or an output depending on which type of electronic device is connected and considerably enhance the convenience of an interface process of switching device 204 (e.g., a process in which a user connects electronic device(s) to AV port(s) 210 of switching device 204).

Accordingly, the techniques and embodiments described herein provide for improvements in auto-detection and adaptive configuration of AV port(s), as described above. Additional details regarding the auto-configuration of AV port(s) may be found in U.S. patent application Ser. No. 14/945,079, filed on Nov. 18, 2015 and entitled "Auto Detection and Adaptive Configuration of HDMI Ports," the entirety of which is incorporated by reference.

System 200 is illustrated as also including adapters 266 that may be any type or number of wired and/or wireless adapters, including but without limitations, wired adapters, modems, local area network (LAN) adapters or internet protocol (IP)-based communication adapters, wireless adapters, near-field communications (NFC) adapters, radio frequency adapters, Bluetooth adapters, infrared adapters, etc., configured to enable system 200, including switching device 204, to communicate with other devices and/or systems over communication links, such as communications between system 200 and a media capture device and/or a control device, e.g., media capture device 120 and/or control device(s) 106 of system 100 in FIG. 1. As an example, a media capture device and/or control device may be configured to provide messages to system 200, such as but not limited to, messages including indicia of captured media/multimedia clips being initialized and/or temporal information thereof, messages including indicia of captured media/multimedia clips being completed and/or temporal information thereof, messages including captured media/multimedia clips and/or temporal information thereof, messages including initiation and/or termination commands for buffered media/multimedia content to be captured, and/or the like. In some embodiments, such messages may be provided from switching device 204 to a user device of a user viewing played-back content that was buffered and/or to a media capture device with indicia of buffer-related clips and/or temporal information thereof.

For instance, switching device 204 is illustrated as including a media buffer 264 and combination logic 262 that may be embodiments of media buffer 118 and combination logic 116 of system 100 in FIG. 1, respectively. Media buffer 264 is configured to buffer or temporarily store media/multimedia content, for a specified amount and/or length of content, which is provided from a source device to be played back by a sink device, as described herein. While exemplarily shown as residing between ports 210 and switch circuit 214 in FIG. 2, media buffer 264 may be located elsewhere in system 200, e.g., may comprise a portion of another component of system 200, or may reside between different components of system 200. Combination logic 262 may receive messages, as described above, via adapters 266 (or via ports 210) from a content capture device, or as internal messages in embodiments where the content capture device comprises a portion of switching device 204. Combination logic 262 is configured to combine captured media/multimedia clips from a media content device with identified portions of the media/multimedia content buffered by media buffer 264, e.g., via overlay, stitching, and/or the like. Portions of media/multimedia content buffered by media buffer 264 are identified, in embodiments, via information in received messages from a content capture device and/or a control device.

B. Automatic Port Mapping to Connected Devices

Figure 3:
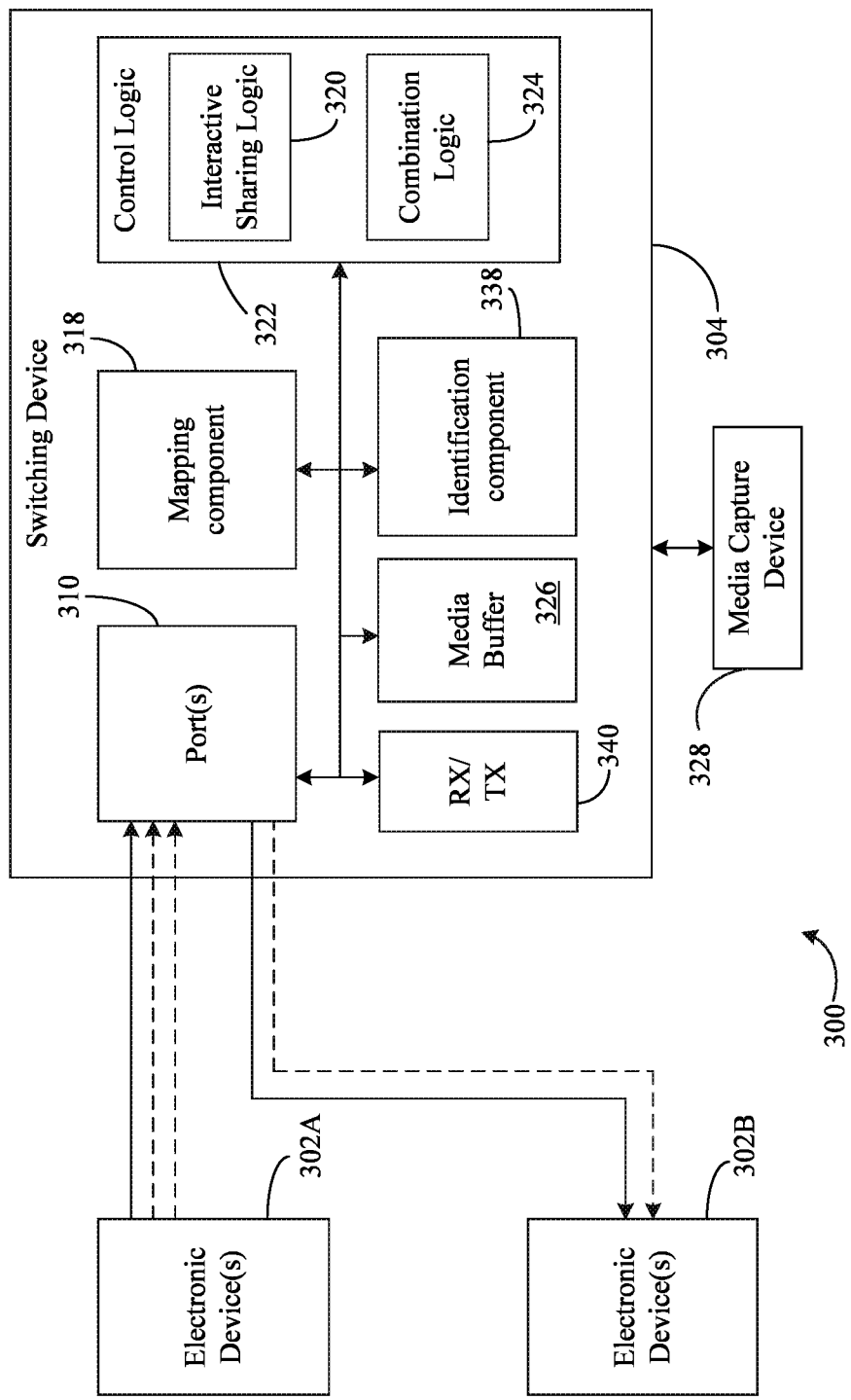
FIG. 3 is a block diagram of a switching device that is configured to enable the generating of combined multimedia content and the sharing of multimedia content provided by an electronic device in accordance with an embodiment.

FIG. 3 is a block diagram of a system 300 that is configured to automatically identify electronic device(s) coupled to AV port(s) of a switching device and map the identified electronic device(s) to the AV port(s) to which they are connected in accordance with an embodiment. As shown in FIG. 3, system 300 includes one or more electronic devices 302A, one or more electronic devices 302B and switching device 304. Electronic device(s) 302A are source devices configured to provide audio and/or video signals. Electronic device(s) 302B are sink devices configured to receive audio and/or video signals. Electronic device(s) 302A may be examples of electronic devices 102A-102C, and electronic device(s) 302B may be examples of electronic device 102D, as described above in reference to FIG. 1. Also shown in FIG. 3 is a media capture device 328 that may be an embodiment of media capture device 120 of FIG. 1.

Switching device 304 is an example of switching device 104 or switching device 204, as described above in reference to FIGS. 1 and 2, respectively. As shown in FIG. 3, switching device 304 includes AV port(s) 310, transceiver 340, mapping component 318, control logic 320, a media buffer 326, and identification component 338. Each of electronic devices 302A and 302B are coupled to an AV port of AV port(s) 310. Each of AV port(s) 310 may be automatically configured to be a source AV port or a sink AV port in a similar manner as described above in Subsection A.

Transceiver 340 is an example of transceiver 240 as described above in reference to FIG. 2. Accordingly, transceiver 340 may be configured to receive audio and/or video signals and to transmit audio and/or video signals. In other words, transceiver 340 provides received input audio and/or video signals from source devices as output audio and/or video signals to sink devices, in accordance with the embodiments herein.

Media buffer 236 may be an embodiment of media buffer 118 of FIG. 1 and/or media buffer 264 of FIG. 2, and is configured, in embodiments, to buffer or temporarily store media/multimedia content, for a specified amount and/or length of content, which is provided from a source device to be played back by a sink device, as described herein.

Identification component 338 may be configured to identify the electronic device (e.g., electronic device(s) 302A or 302B) coupled to each AV port of AV port(s) 310. For example, for each of electronic device(s) 302A or 302B, identification component 338 may be configured to determine identifier(s) of the electronic device, such as, but not limited to a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Identification component 338 provides the identifier(s) to mapping component 318.

Mapping component 318 is configured to determine a device-to-port mapping based on the identifier(s) received from identification component 338. For example, mapping component 318 may generate and/or store a data structure (e.g., a table) that associates the identifier(s) for any given identified electronic device to the AV port to which that electronic device is coupled. In this way, the device-to-port mapping may indicate that a first electronic device (e.g., a Blu-ray player) is coupled to a first AV port (e.g., AV Port 1), that a second electronic device (e.g., a STB) is coupled to a second AV port (e.g., AV Port 2), and that a third electronic device (e.g., a TV) is coupled to a third AV port (e.g., AV Port 3).

Additional details regarding the identification of electronic device(s) and the mapping of electronic device(s) to AV port(s) may be found in U.S. patent application Ser. No. 14/945,125, filed on Nov. 18, 2015 and entitled "Automatic Identification and Mapping of Consumer Electronic Devices to Ports on an HDMI Switch," the entirety of which is incorporated by reference.

Control logic 320 is an example of control logic 220 as described above in reference to FIG. 2. In accordance with techniques described herein, control logic 220 includes interactive sharing logic 322, which is an embodiment of interactive sharing logic 114 described above with reference to FIG. 1, and combination logic 324 which is an embodiment of combination logic 116 described above with reference to FIG. 1 and/or combination logic 262 described above with reference to FIG. 2. As described below in Subsection C, interactive sharing logic 322 may enable the sharing of a user-interactive identifier, information associated with multimedia content, and/or a portion of the multimedia content provided by one of the output devices (e.g., one of electronic device(s) 302A) connected to port(s) 310 to another user, and combination logic 324 is configured to enable the generation of combined media content from buffered multimedia content clips and captured clips from a media capture device.

C. Combined Media/Multimedia Content Generation and Multimedia Content Sharing

Figure 4:
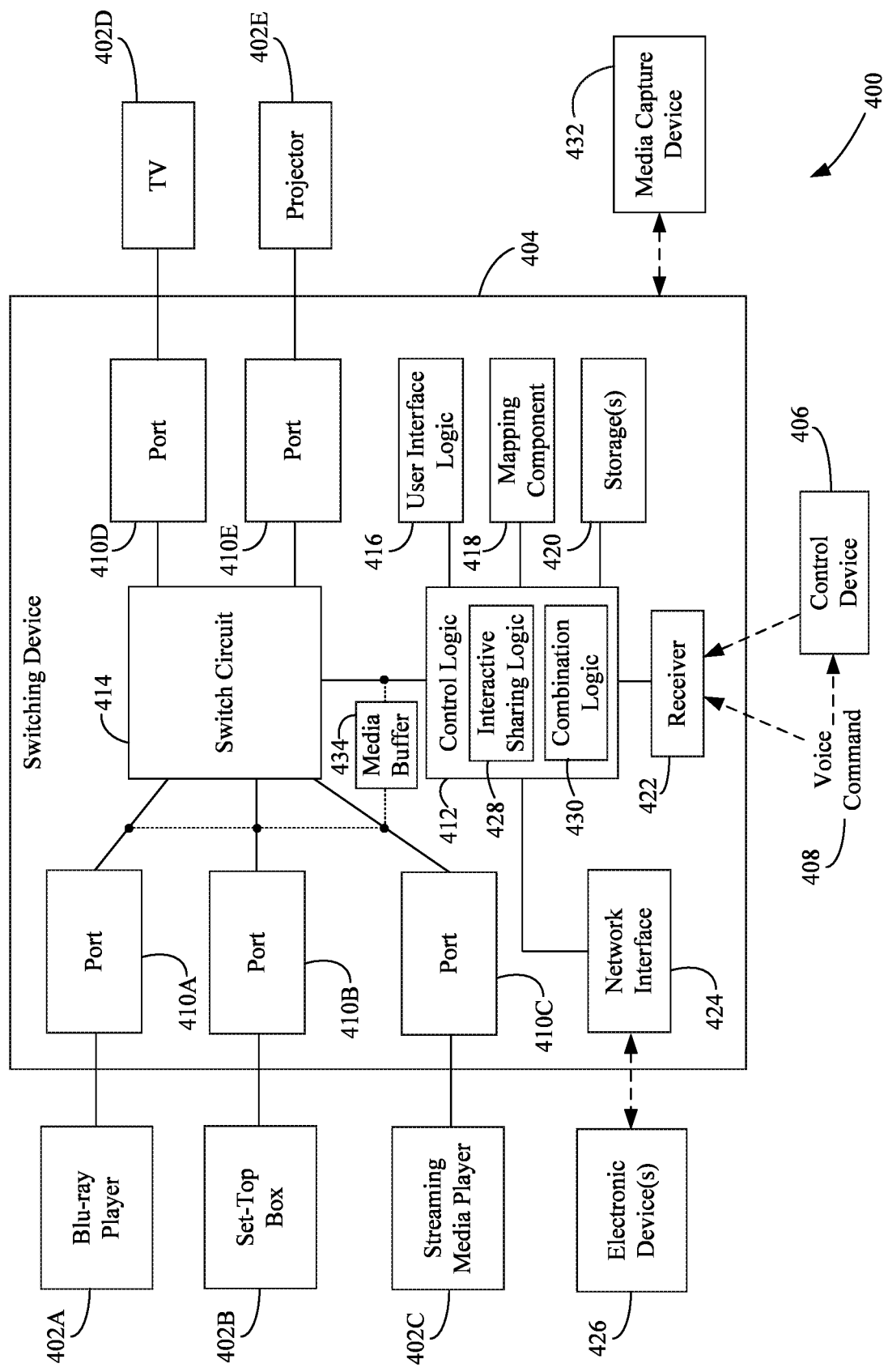
FIG. 4 is a block diagram of a system that is configured to enable the generating of combined multimedia content and the sharing of multimedia provided by an output device in accordance with an embodiment.

FIG. 4 is a block diagram of a system 400 that is configured to enable combined media content generation and sharing of content, in accordance with an embodiment. As shown in FIG. 4, system 400 includes electronic devices 402A-402E, one or more electronic device(s) 426, a switching device 404, a control device 406, and a voice command 408. System 400 is described as follows.

In the illustrative example shown in FIG. 4, electronic devices 402A-402C are source devices configured to provide audio and/or video signals. Electronic devices 402D and 402E are sink devices configured to receive audio and/or video signals. As shown in FIG. 4, electronic device 402A is a Blu-ray player, electronic device 402B is a STB, electronic device 402C is a streaming media player, electronic device 402D is a TV and electronic device 402E is a projector. The depiction of these particular electronics devices is merely for illustrative purposes. Each of electronic devices 402A-402E may be any electronic device capable of providing and/or playing back AV signals.

Switching device 404 is an example of switching device 104, switching device 204 or switching device 304, as described above in reference to FIGS. 1-3, respectively. As shown in FIG. 4, switching device 404 includes AV ports 410A-410E, control logic 412, a switch circuit 414, user interface logic 416, a mapping component 418, one or more storage(s) 420, a receiver 422, and a network interface 424. As further shown in FIG. 4, electronic device 402A is coupled to AV port 410A, electronic device 402B is coupled to AV port 410B, electronic device 402C is coupled to AV port 410C, electronic device 402D is coupled to AV port 410D and electronic device 402E is coupled to AV port 410E. AV ports 410A-410C may be automatically configured to be source AV ports, and AV ports 410D and 410E may be automatically configured to be sink AV ports in a similar manner as described above in Subsection A.

Switch circuit 414 is an example of switch circuit 214 as described above in reference to FIG. 2. Switch circuit 414 may be configured to connect a particular source AV port (e.g., AV ports 410A, 410B, or 410C) to a particular one or more sink AV ports (e.g., AV port 410D and/or AV port 410E) based on a command (e.g., a command from control device 406 or via a voice command 408).

Receiver 422 may include a sensor or the like configured to receive a command from a user to control switching device 404 or any of electronic devices 402A-402E. For instance, receiver 422 may receive control signals from one more input devices, such as a remote control (e.g., control device 406), that may be operable to control one or more functions of switching device 404 or transmit operation commands (or other commands) to switching device 404. In embodiments, receiver 422 may include an IR sensor and/or an RF receiver configured to receive signals via any suitable protocol, such as via Wi-Fi, Bluetooth®, ZigBee® RF4CE, etc., in embodiments. In other embodiments, receiver 422, or control device 406, may include a microphone configured to capture a voice command 408 from a user. Using techniques known to those skilled in the art, voice command 408 may be converted automatically to text, which may be used by one or more components of switching device 404 in accordance with techniques described herein.

For instance, receiver 422 may receive an operation request from a user to perform any desired action on one of the electronic devices 402A-402E or on switching device 404. Receiver 422 may receive an operation request through control device 406 or via voice command 408, or through any other suitable interface. By way of a non-limiting example, an operation request may include a request to launch a particular application or multimedia content (e.g., a television show or a movie) or switch an input or output via switch circuit 414. In accordance with techniques described herein, an operation request may include a command to record multimedia content, select a portion of multimedia content for sharing, edit a multimedia content using an interactive editor, and/or share multimedia content (or a portion thereof) with one or more selected users.

In embodiments, control device 406 may be operable to control one of electronic device(s) 402A-402E or switching device 404 by transmitting control signals thereto. In accordance with an embodiment, the control signals are transmitted via a wired connection (e.g., via a Universal Serial Bus (USB) cable, a coaxial cable, etc.). In accordance with another embodiment, the control signals are transmitted via a wireless connection (e.g., via IR communication, RF communication (e.g., Bluetooth™, as described in the various standards developed and licensed by the Bluetooth™ Special Interest Group, technologies such as ZigBee® that are based on the IEEE 802.15.4 standard for wireless personal area networks, NFC, other RF-based or IP-based communication technologies such as any of the well-known IEEE 802.11 protocols, etc.) and/or the like.

Control device 406 may comprise any suitable user interface, including a physical user interface, graphical user interface, voice-based user interface, or the like. For instance, control device 406 may comprise physical interface elements, such as, but no limited to, a power button, a volume up button, a volume down button, number keys, and/or letter keys. Control device 406 may include a display screen and/or one or more physical interface elements (e.g., buttons, sliders, jog shuttles, etc.). In accordance with an embodiment, the display screen (or a portion thereof) may be a capacitive touch display screen. The display screen may be configured to display one or more virtual interface elements (e.g., icons, buttons, search boxes, etc.). One or more of the user interface elements on control device 406 may be activated when pressed (e.g., such interface elements may be click-sensitive), rather than simply being touched. This advantageously enables control device 406 to unambiguously determine that a user intended to activate such interface element(s) instead of accidentally touching such interface element(s). In accordance with one or more embodiments, one or more of interface elements may provide tactile feedback when activated. Actuation of any one of the user interface elements may cause control device 406 to transmit a signal to receiver 422, as shown in FIG. 4.

Examples of control device 406 include, but are not limited to, a remote control device, a desktop computer, a laptop, a tablet, a smart phone, a personal data assistant, and/or any other device that is communicatively coupled to the electronic device in order to control the electronic device. For instance, control device 406 may be capable of providing an additional, or alternative, interface (e.g., via an application installed on the control device) with which a user may interact to carry out the techniques described herein, including but not limited to recording multimedia content, selecting a portion of content to share, selecting one or more users to share content with, and/or editing a portion of recorded multimedia content as described in more detail below. Control device 406 may further be configured to provide a user with a listing of recorded content as an alternative to accessing such a listing on a display device coupled to switching device 404. As a result, because the functions described herein to enable combined media content generation and sharing of content with one or more users may be provided directly in control device 406, a user may record and/or share clips with one or more users without disturbing playback of the multimedia content on the display device.

It is noted that system 400 may comprise additional control device(s) that are operable to control any of electronic devices 402A-402E or switching device 404. In another embodiment, control device 406 may be a universal remote control that may be configured to operate a plurality of electronic devices 402A-402E, and/or any other electronic device, such as switching device 404.

Mapping component 418 is an example of mapping component 318 as described above in reference to FIG. 3. Mapping component 418 may be configured to identify a source device (e.g., electronic device 402A, electronic device 402B, or electronic device 402C) to be used for providing content and/or one or more sink devices (e.g., electronic device 402D or electronic device 402E) for presenting the content based on a user input. Mapping component 418 may be further configured to identify the AV port(s) to which the identified source device and/or sink device are connected (as described above in Subsection B) and provide an identifier to control logic 412 that identifies the identified AV port(s).

Figure 10:
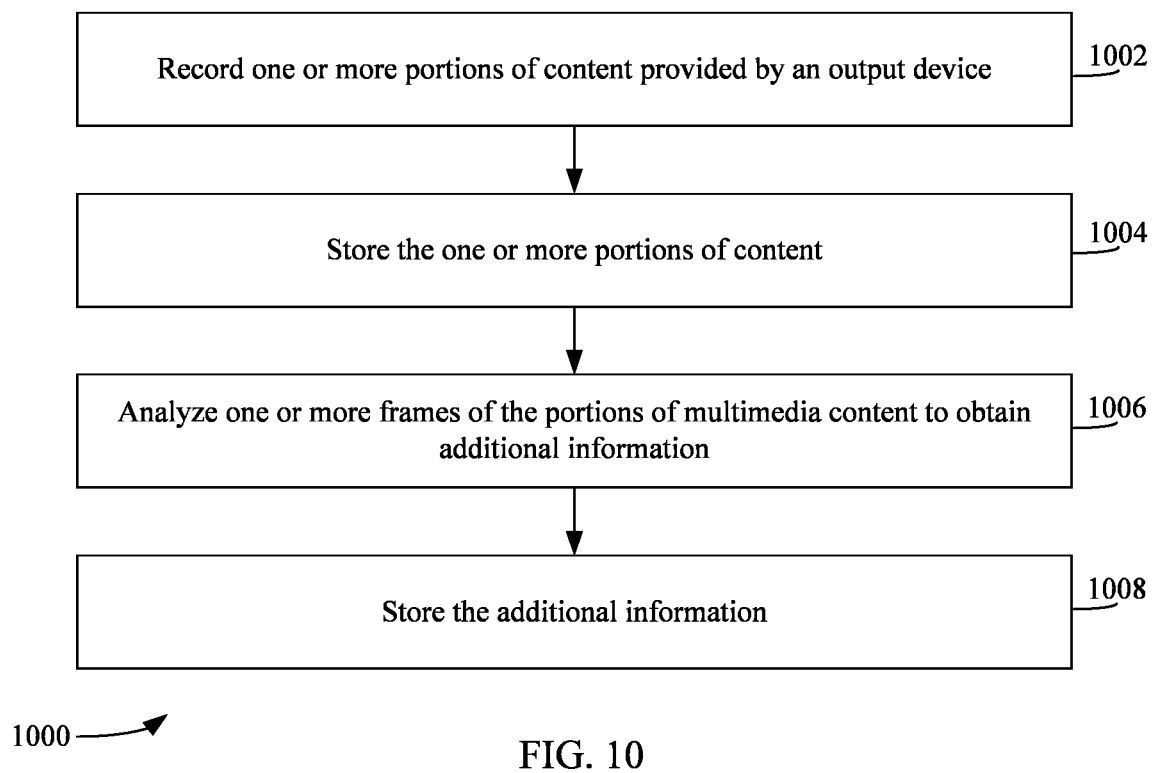
FIG. 10 depicts a flowchart of a method for obtaining and storing information associated with one or more recorded portions of multimedia content in accordance with an embodiment.

Storage(s) 420 may be one or more of any storage device described herein, such as, but not limited to, those described below with respect to FIG. 10. Storage(s) 420 may include a storage for storing multimedia content presented by any one of electronic device(s) 402A-402C. For instance, a user may issue a command via a control device 406 or a voice command 408 to record multimedia content, or a portion thereof, resulting in storage(s) 420 storing such recorded content. In embodiments, storage 420 may further include information associated with each item of recorded multimedia content, such as metadata information associated with the multimedia content, a service providing the multimedia content (e.g., an application such as Netflix®), a source device (e.g., an AppleTV®, a Roku® device, a STB, etc.) providing the multimedia content, a time index associated with the multimedia content (e.g., a starting time, an ending time, and/or a run time for the recorded multimedia content), a unique identification assigned to the multimedia content by the service providing the multimedia content (e.g., a name or other identifier associated with the multimedia content, a season and/or episode number, a description, summary, or overview of the multimedia content, etc.), or one or more other services that provide the multimedia content (e.g., other services through which the multimedia content may also be accessible).

In accordance with another embodiment, storage(s) 420 may further be configured to store additional information regarding one or more items of multimedia content. For instance, additional multimedia content (e.g., other video and/or audio clips) related to one or more items of recorded multimedia content, a brand or type of product present in one or more items of multimedia content, an actor or actress present in one or more items of multimedia content, and/or a filming location of one or more items of multimedia content. It is understood that this list is not exhaustive. Rather, the additional multimedia content that may be stored in storage(s) 420 may include any information obtained or extracted from analyzing one or more frames of recorded multimedia content in accordance with embodiments described herein.

In accordance with embodiments, storage(s) 420 may include a data structure (e.g., a table/database, or the like) that associates information with a particular item of multimedia. In embodiments, storage(s) 420 may be local (e.g., within switching device 404 or on a device local to switching device 404, such as an external storage device), or remote (e.g., on a remote device, such as a cloud-based system or on one of electronic device(s) 426).

Network interface 424 is configured to enable switching device 404 to communicate with one or more other devices (e.g., electronic device(s) 426) via a network, such as a local area network (LAN), wide area network (WAN), and/or other networks, such as the internet or a cellular or mobile network. Network interface 424 may include any suitable type of interface, such as a wired and/or wireless interfaces. In embodiments, network interface 424 may enable switching device 404 with two-way communication with one or more remote (e.g., cloud-based) systems. For instance, a remote system, such as a cloud-based server, may enable the storage of multimedia content (or portions thereof) recorded via switching device 404 from any of electronic devices 402A-402E. For instance, switching device 404 may be configured to automatically store recorded multimedia content in a remote system (e.g., a cloud-based system) in addition, and/or as an alternative to storing such recorded content in one of storage(s) 420. In other embodiments, switching device 404 may store recorded content on a remote system in response to a user input received from a control device 406 or via voice command 408. It is also contemplated that receiver 422 and/or network interface 424 may be embodiments of adapters 266 of FIG. 1, described above, or vice versa.

In embodiments, a remote system may further aid in one or more processing functions of switching device 404 by performing one or more steps of the techniques described herein. For example, in accordance with embodiments discussed herein, a remote system may be configured to analyze recorded multimedia content (or portions thereof, such as one or more frames of the multimedia content) to obtain additional information relating to the multimedia content. Given that the remote systems may be able to provide additional processing power beyond switching device 404, the process of analyzing multimedia content to obtain additional information may be completed even faster by leveraging this additional processing capability.

Electronic device(s) 426 may include any type of device capable of communicating with switching device 404 via a suitable interface (e.g., network interface 424 as shown in FIG. 4). For instance, electronic device(s) 426 may comprise any well-known processing devices, telephones (cellular phones, smart phones and/or mobile phones), servers, electronic devices (e.g., consumer electronic devices) and/or computer/computing devices (laptops, tablets, desktops, etc.), such as a computer 1000 shown in FIG. 10. In accordance with embodiments, the embodiments herein may also be adapted to any other type of communication devices, computing systems, other electronic devices such as gaming consoles, TVs, HDTVs, other home electronics and entertainment devices, HDMI repeaters or switches (such as another switching device 404), and/or the like, that may include input/output ports into which multimedia devices are connected.

User interface logic 416 may be configured to enable combined media content generation and the sharing of content in accordance with the techniques described herein. For example, user interface logic 416 may provide selectable objects (e.g., via on-screen menus and/or selectable icons) on a sink device (e.g., electronic device 402D or 402E) in accordance with embodiments. In one embodiment, user interface logic 416 may be configured to enable a user to initiate (e.g., via control device 406 or voice command 408) a recording of multimedia content presented by one of electronic devices 402A-402C. In another embodiment, user interface logic 416 may be configured to enable a user to select a portion of multimedia content to share and/or select one or more users to transmit the portion of multimedia content. In yet another embodiment, user interface logic 416 may enable a user to view and/or interact with information associated with, or relating to, the recorded multimedia content. In yet another embodiment, user interface logic 416 may provide an interactive editor configured to enable a user to edit a portion of recorded multimedia content (e.g., a video editor that a user may utilize to edit a video prior to sharing with another user). The examples described herein are without limitation, however, as user interface logic 416 may be configured to enable a user to interact with switching device 404 in accordance with any of the techniques described herein.

Control logic 412 is an example of control logic 220 as described above in reference to FIG. 2 and/or control logic 320 described above in reference to FIG. 3. Based on mapping component 418 and a user input received by receiver 422, control logic 412 may be configured to provide a control signal to switch circuit 414, which causes switch circuit 414 to connect the identified source AV port to the identified and/or determined one or more sink AV ports.

Control logic 412 further includes interactive sharing logic 428 and combination logic 430. Interactive sharing logic 428 is an example embodiment of interactive sharing logic 112, interactive sharing logic 260, and interactive sharing logic 322 described above in reference to FIGS. 1-3, respectively. In accordance with embodiments, interactive sharing logic 428 may be configured to enable the sharing of a user-interactive identifier, information associated with multimedia content, and/or the multimedia content (or portions thereof) presented by an output device (e.g., any one of electronic devices 402A-402C). Multimedia content may be shared with another user (e.g., a user of electronic device(s) 426) through any suitable interface (e.g., network interface 424 as shown in FIG. 4).

For example, if a user is watching a program presented by streaming media player 402C and decides to share an interesting scene (e.g., a short clip or a single frame), receiver 422 can receive a command from a user to capture and/or share the portion of the multimedia content. In an embodiment, a user can issue a command via a single interface element on control device 406 that automatically captures the last N seconds (e.g., the last 5, 10, 20, or 30 seconds, etc., as non-limiting examples) of the multimedia content presented by streaming media player 402C. In this manner, because the portion of the multimedia content may be captured from a buffer, e.g., media buffer 434 that may be an embodiment of media buffer 326 of FIG. 3, a user need not rewind the program to record the interesting scene. In another embodiment, a user may press and hold an interface element on control device 406 (or via a similar voice command to start and stop a recording), which may cause interactive sharing logic 428 to record a portion of multimedia content as long as the user is holding onto the interface element. This enables the user to effectively select multimedia content for a user-specified period of time, rather than the last N seconds from the buffer. It should be noted that the location and connections shown in FIG. 4 for media buffer 434 are exemplary in nature, and that additional and/or alternative locations and/or connections are also contemplated in embodiments.

In embodiments, upon receiving a user selection of a portion of multimedia content to share (e.g., by selecting, capturing and/or recording content through interaction with control device 406 and/or via voice command 408), interactive sharing logic 428 may automatically obtain information (e.g., a program name, a source of the content, etc.). Because switching device 404 is a smart switching device that can interact with electronic devices 402A-402C, interactive sharing logic 428 can obtain information associated with the content viewed by the user automatically and with minimal user involvement. As a result, the user need not manually input information associated with the selected content.

In accordance with embodiments, interactive sharing logic 428 may receive (e.g., via interaction with user interface logic 416) the identity of one or more other users to tag and/or with whom to share the portion of the multimedia content being played back. For instance, a user may select a user of any one of electronic device(s) 426 to share the portion of the multimedia content. Upon receiving a selection, interactive sharing logic 428 may transmit, via a suitable interface (e.g., network interface 424) a user-interactive identifier where the multimedia content may be accessed, information associated with multimedia content, and/or the portion of the multimedia content (e.g., a short clip or a single frame) to the selected user(s). In other embodiments, interactive sharing logic 428 may be configured to provide, via a display device (e.g., electronic device 402D or 402E) the user-interactive identifier that the user may choose to share with one or more selected users. In embodiments, facial and/or audio recognition performed (e.g., by media capture device 432, or by switching device 404 and/or by a cloud-based service associated therewith) on captured real-time media clips captured by content capture device 432, either separately without combining or as part of combined media content, may be used to identify one or more other users to tag in combined content and/or with which to share content, including combined media content as described herein. Additionally, any persons/users identified and/or tagged may have their respective user/usage profiles updated, by switching device 404 and/or a service associated therewith, to reflect their preferences for consuming content (e.g., content type, times and/or locations consumed, specific content identifiers, etc.), and recommendations may later be provided to the users for the same or similar content to that which is was played-back during the generation of the combined media content. Furthermore, a user of switching device 404 may also have user/usage profiles updated for their preferences for consuming content (e.g., content type, times and/or locations consumed, specific content identifiers, etc.) based on actions taken to capture real-time media clips for combining, their emotions and/or reactions to played-back content, their lack of emotions and/or reactions to played-back content, and/or the like, and subsequent recommendations to the user may then be similarly made. Any usage or user profile/preference information obtained in the foregoing manner may be utilized by switching device 404 and/or associated backend and/or cloud-based servers to which the switching device 404 may be connected to facilitate the generate of content recommendations for the relevant user(s).

Thus, a user of switching device 404 may easily and effortlessly share multimedia content viewed in real-time without the need to engage in cumbersome steps or requiring additional hardware (e.g., a separate computer). Furthermore, because interactive sharing logic 428 can automatically determine and transmit a user-interactive identifier along with information associated with the multimedia content, a user of switching device 404 need not separately input such information, thus further speeding up the sharing techniques described herein.

As noted above, embodiments herein also provide for generating combined media content. For instance, combination logic 430 is configured to generate combined media content such as but not limited to synchronized combinations of captured real-time media content with played-back digital content, according to embodiments. Such combinations, like combined media content as described herein, are generated by combination logic 430 and may be stored for later playback and/or sharing in conjunction with interactive sharing logic 428, in embodiments. Combination logic 430 may be an example embodiment of combination logic 116, combination logic 262, and combination logic 324 described above in reference to FIGS. 1-3, respectively.

Combination logic 430 may be configured to generate combined media content from clips identified in buffered multimedia content in media buffer 434 that is to be presented or played-back by an output device (e.g., any one of electronic devices 402A-402C) with captured media clips from a media capture device 432 that may be an embodiment of media capture devices described above. As noted herein, combined multimedia content may be stored for later playback in storage(s) 420 (or in an external storage such as a cloud-based storage, not shown) and/or shared with another user (e.g., a user of electronic device(s) 426) through any suitable interface (e.g., network interface 424).

For example, if a user is watching a program/content presented by streaming media player 402C and desires to create a personalized memory clip, or a moment in a clip, associated with the presented content, i.e., combined media content, receiver 422, network interface 424, and/or any other adapter described herein, may be configured to receive a message indicating initiation of the personalized memory clip from a user and/or media capture device 432 to identify a portion of the multimedia content stored in media buffer 434, e.g., as described above for interactive sharing logic 428. In some embodiments, media capture device 432 is configured to automatically identify user reactions and/or emotions and provide the initiation message, and/or to also receive initiation messages from control device 406. In embodiments, a user can issue the message via a command/selection from single user interface element on control device 406 and/or media capture device 432, or by voice command 408 to control device 406 and/or media capture device 432. In any of these above-described scenarios, media capture device 432 is configured to capture a media clip, at the designated initiation, where the media clip is completed, e.g., capture is stopped, based on a predefined period of time, a stop command/message, a change in determined user reaction or emotion, and/or the like.

Likewise, a portion of the media content buffered by media buffer 434 is identified as corresponding to, e.g., temporally or synchronized, with the captured media clip by interactive sharing logic 428 based on the messages, e.g., via time stamps and/or the like, in embodiments. In this manner, because the portion of the multimedia content may be captured from a buffer, e.g., media buffer 434, a user need not rewind the program in order to identify buffered content that corresponds to captured media clips from media capture device 432. In embodiments, interactive sharing logic 428 is configured to identify a portion of the buffered, most recent portion of the media content stream based on the messages associated with the initiation and/or termination of capturing captured real-time media clips, described herein. In embodiments, a user may press and hold an interface element on control device 406 and/or media capture device 432 (or via a similar voice command to start and stop a recording), which may cause interactive sharing logic 428 to identify a portion of buffered multimedia content as long as the user is holding onto the interface element. Similarly, media capture device 432 is configured to receive indicia of the interface element interaction, in embodiments, and correspondingly capture a media clip. This enables the user to effectively select buffered multimedia content and a time over which to capture real-time media clips and identify buffered content for generating combined media content for a user-specified period of time.

In embodiments, when a real-time media clip is captured and the buffered content portion is identified, the real-time media clip the buffered content portion are combined by combination logic 430, according to embodiments. Such combining generates an instance of combined media content, e.g., a combination to two clips that concurrently captures two different perspectives of an event in the same or approximately the same absolute time period, which is then stored for later playback and/or shared according to embodiments herein.

Thus, a user of switching device 404 may easily and effortlessly generate combined media content from captured media clips and buffered media clips and share combined media content without the need to engage in cumbersome steps or requiring additional hardware (e.g., a separate computer). Furthermore, because interactive sharing logic 428 can automatically determine and transmit a user-interactive identifier along with information associated with the multimedia content (e.g., attributes thereof), a user of switching device 404 need not separately input such information, thus further speeding up the sharing techniques described herein, as well as preserving identifiers of any users included in the combined media content for subsequent playback and/or sharing of personalized memory clips.

Figure 5:
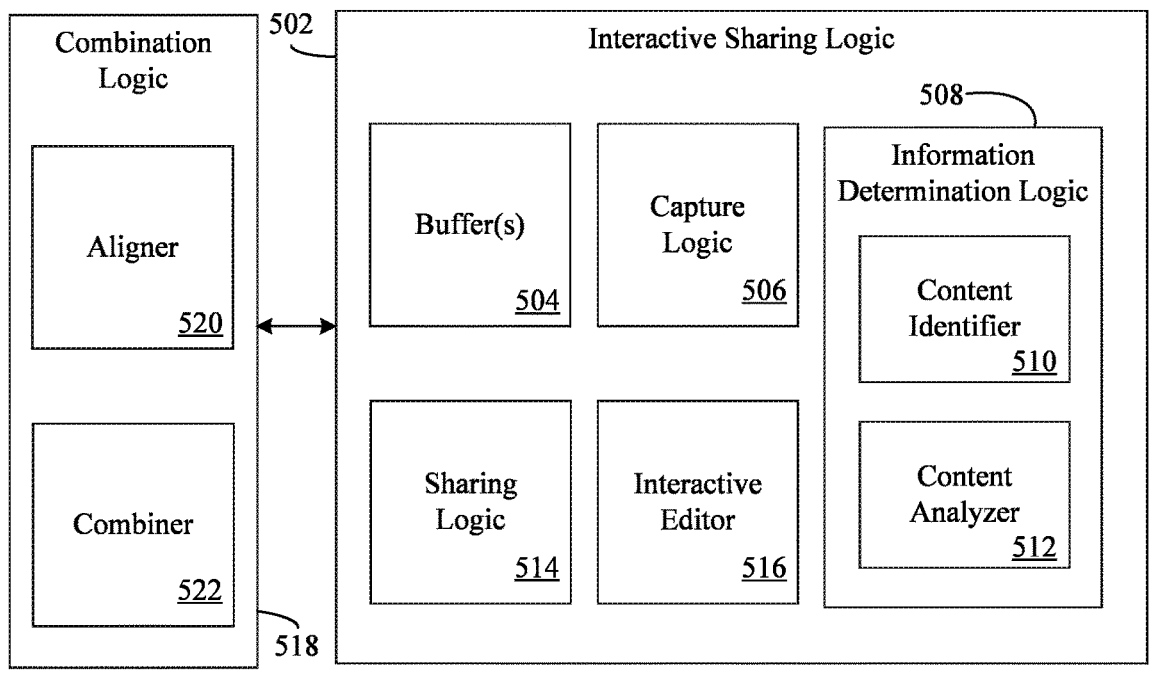
FIG. 5 is a block diagram of a portion of interactive sharing logic configured to enable the sharing of multimedia content and combination logic configured to combine captured real-time media content with played-back digital content in accordance with an embodiment.

Accordingly, as described above in embodiments, interactive sharing logic 428 may be configured to enable the sharing of multimedia content being viewed or played-back by a user as well as combined media content, and combination logic 430 may be configured to generate combined media content from captured media clips and buffered media clips. FIG. 5 will now be described.

FIG. 5 is a block diagram of a system 500 for exemplary interactive sharing logic implementation 502 of interactive sharing logic 428 and combination logic 518 of combination logic 430 described herein. As shown in FIG. 5, interactive sharing logic 502 may include one or more buffer(s) 504 configured to automatically store a predetermined length of multimedia content viewed by a user, capture logic 506 configured to record multimedia content presented by an output device and receive a selection of a portion of the multimedia content for sharing, information determination logic 508 comprising a content identifier 510 and a content analyzer 512 configured to obtain information associated with, or relating to, recorded multimedia content (e.g., attributes thereof), sharing logic 514 configured to receive a selection of one or more users to share the portion of the multimedia content with, and an interactive editor 516 configured to enable a user to edit a previously captured portion of multimedia content. Combination logic 518 is illustrated as including an aligner 520 configured to temporally align, synchronize, or otherwise associate a captured real-time media clip with a corresponding portion of buffered media content (e.g., digital content that is played-back, as described herein), and a combiner 522 that may be configured to combine the captured real-time media clip with a corresponding portion of buffered media content, and/or to combine more than two clips from one or more instances of a media capture device with buffered media/multimedia content for playback into a single combined media content file and/or into multiple files of combined media content. It is contemplated, however, that in various embodiments, one or more components of interactive sharing logic 502 and/or combination logic 518 as shown in FIG. 5 may not be included and that additional components may be included. Additionally, buffer(s) 504 may be an embodiment of any media buffer, as described herein.

Although it is depicted in FIG. 5 that buffer(s) 504, capture logic 506, information determination logic 508, content identifier 510, content analyzer 512, sharing logic 514, and interactive editor 516, as well as aligner 520 and combiner 522, may be part of a first device (e.g., comprising interactive sharing logic 502 and combination logic 518 of a switching device such as switching device 404), it is contemplated that any one or more of the sub-blocks may be present on another computing device (e.g., a remote server coupled via network interface 424). For instance, in accordance with embodiments described herein, a first device (e.g., switch 202) may comprise one or more processing components shown, while a second device (e.g., a remote server, a cloud-based server and/or storage, etc., not shown) comprises one or more other of the processing components (e.g., aligner 520, combiner 522, information determination logic 508, content identifier 510, and/or content analyzer 512). In this manner, because the sub-blocks of combination logic 518 and interactive sharing logic 502 shown in FIG. 5 may be carried out by different processing components, additional computing resources of a second device (e.g., a remote server, cloud-based server and/or storage, etc.) may be leveraged to increase the speed at which the sharing and/or combining techniques take place. In addition, by leveraging additional computing resources (e.g., one or more processors) of a second device, the first device (e.g., switching device 404) may not need to perform processor intensive activities, which may result in a manufacturing cost reduction of the first device.

Figure 6:
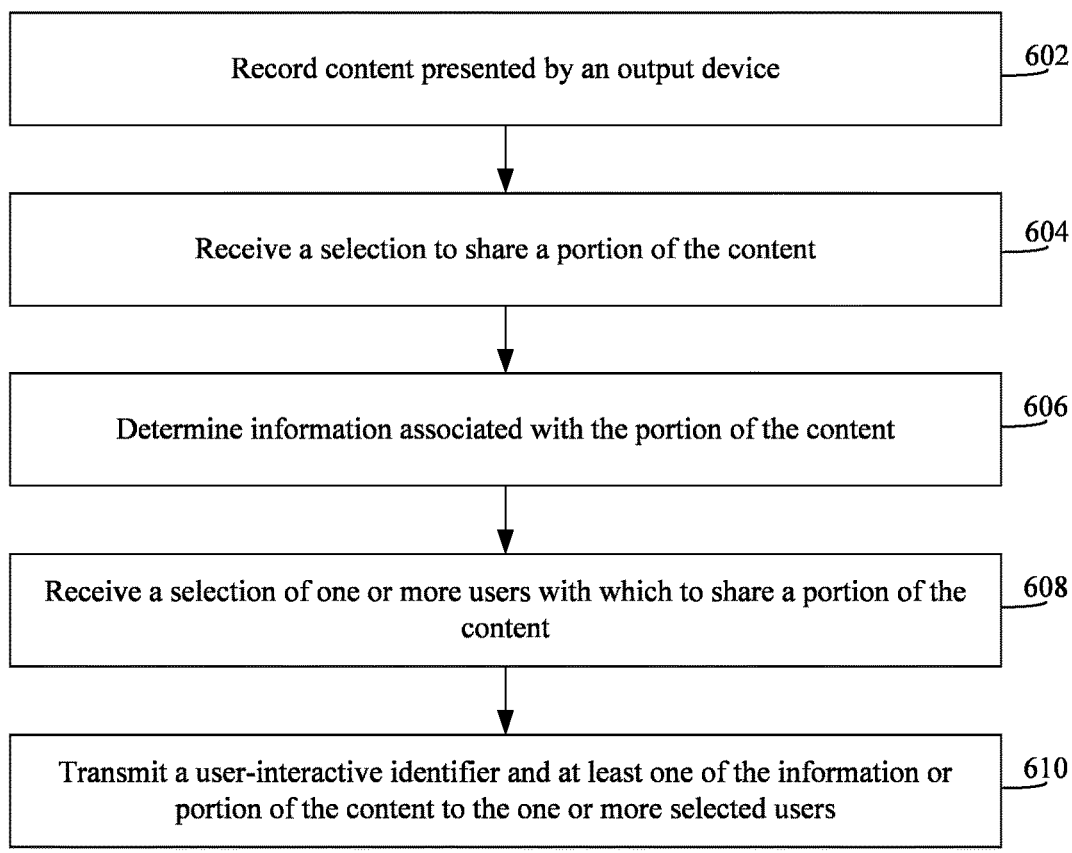
FIG. 6 depicts a flowchart of a method for transmitting multimedia content to a user in accordance with an embodiment.

Accordingly, in embodiments, generating combined media content and sharing an interactive identifier, along with along with information associated with the multimedia content and/or the multimedia content, may be carried out in many ways. For instance, FIG. 6 depicts a flowchart 600 of a method performed by a device (e.g., a multimedia switching device) enabling the sharing of multimedia content in accordance with an embodiment. The method of flowchart 600 may be implemented by system 400 as described above in reference to FIG. 4 and interactive sharing logic 502 described above in reference to FIG. 5. Other structural and operational embodiments will be apparent to persons skilled in the relevant art(s) based on the following discussion regarding flowchart 600, system 400, and interactive sharing logic 502.

Flowchart 600 begins with step 602. At step 602, content presented by an output device may be recorded. For instance, multimedia content may be provided by any one of electronic devices 402A-402C discussed above to switching device 404. In embodiments, switching device 404, via switch circuit 414, may provide the content to a sink device, such as one of electronic devices 402D or 402E such that the multimedia content may be viewed by a user.

In accordance with embodiments, interactive sharing logic 502 may record multimedia content provided by an output device (e.g., one of electronic devices 402A-402C). In embodiments, capture logic 506 may be configured to control the recording and storage of multimedia content in either buffer(s) 504 and/or storage(s) 420 of switching device 404 in accordance with the techniques described. In accordance with an embodiment, capture logic 506, upon receiving audio/video content from an output device, may decode the audio/video content, synchronize the audio and video in time (for example, to compensate for any delay caused from the decode process), multiplex together the audio and video from the audio/video content, encode the multiplexed audio and video, and/or store the encoded audio and video in buffer(s) 504. Capture logic 506 may cause buffer(s) 504 to continuously record a certain or predetermined amount of content provided by the output device while the user is watching and/or listening to multimedia content played back via a sink device (e.g., a display or other playback device). For instance, capture logic 506 may be configured to cause buffer(s) 504 to continuously store the last 10 seconds, last 5 minutes, last 15 minutes, or last 60 minutes (or any other time period) of multimedia content (e.g., audio and/or video content) presented by an output device. In embodiments, capture logic 506 may identify a length of time of multimedia content to be continuously recorded in buffer(s) 504 (e.g., through a user setting via user interface logic 416 and/or by preprogramming a length of time into capture logic 506).

As an example, a user may interact with a control device 406 (e.g., by a single press of a "record" button or interface element) or issue a voice command 408 to record a clip. Because the last N seconds (e.g., 20 seconds or any other specified or predetermined time) of the currently watched multimedia content has been automatically recorded in buffer(s) 504, capture logic 506 can be configured save the buffered content as a "clip" in response to receiving the user command, and store the recorded clip in a persistent or non-volatile storage in switching device 404 (e.g., in storage(s) 420 or in a remotely-located storage). In this manner, buffer(s) 504 may continuously record additional multimedia content as it is provided by the output device, capture logic 506 stored the desired clip in a storage for subsequent access, viewing, and/or sharing by the user.

In embodiments, buffer(s) 504 may be implemented via a hard disk, a removable magnetic disk, a removable optical disk, flash memory cards, secure digital (SD) memory cards, digital video disks, random access memories (RAMs), an/or the like. One or more buffer(s) 504 may be located locally (e.g., in switching device 404), and/or may be located on a remote storage (not shown) accessible via a suitable interface (e.g., network interface 424).

By incorporating buffer(s) 504 in the above manner, a user need not manually rewind multimedia content to capture an interesting portion to share with another user. Rather, as described herein, capture logic 506 may automatically obtain and store multimedia content (e.g., the last 20 seconds) recorded in buffer(s) 504 in response to a user command (e.g., via a control device 406 or voice command 408) to record a short clip.

In other embodiments, capture logic 506 may be configured to record multimedia content that has not been stored in buffer(s) 504. For example, if a user is viewing/listening to content from streaming multimedia device 402C, such content may not need to be buffered where previously viewed/listened to content may be recorded by downloading the content directly from the service providing the content. For instance, if a user is viewing/listening to content from streaming multimedia device 402C and instructs switching device 404 to record a clip (e.g., the last N seconds), capture logic 506 may be configured to download the last N seconds of content from the service (e.g., Netflix®) and store the recorded content in a persistent or non-volatile storage on switching device, such as storage(s) 420.

In another embodiment, capture logic 506 may be configured to record multimedia content provided by an output device for a time period indicated by a user input. For instance, a user may press and hold a "record" button or interface element on control device 406. In this scenario, capture logic 506 is configured to begin recording multimedia content when the record button is pressed, and stops recording when the recording button is released. In other embodiments, instead of interacting with control device, multimedia content may be recorded for a user specified time period via voice command 408 (e.g., by instructing switching device 404 to start recording content at a first point in time followed by a command to stop recording content at a second point in time). In this manner, multimedia content may be recorded in real-time, rather than recording previously watched/listened to content.

In an embodiment, capture logic 506 may also be configured to record a single frame of the content, rather than a video, thereby causing an image to be recorded.

In accordance with the techniques described herein, upon recording content provided by an output device, capture logic 506 may automatically store each clip of recorded multimedia content on switching device 404 (e.g., in storage(s) 420). In other embodiments, recorded multimedia content may be stored automatically on another device (e.g., a smartphone, tablet, or other computing device coupled to switching device), or on a remote (e.g., cloud-based) storage rather than, or in addition to, storing the clips in storage(s) 420. In other embodiments, one switching device 404 may be coupled to one or more other switching devices (not shown) via network interface 424. In such an embodiment, each switching device may automatically share recorded clips with each other without further user involvement, thus enabling a user to easily access recorded clips of other users.

In embodiments, playback of multimedia content on electronic devices 402D or 402E is not interrupted while recording a clip in response to a user instruction. For instance, capture logic 506 may be configured to record content in the background, thus minimizing any disruption to the continuous playback of content. In another embodiment, capture logic 506 may be configured to cause an overlay to appear on a display screen (e.g., electronic device 402D or 402E) during playback (e.g., in a picture-in-picture (PIP) window) or in a window alongside the content being watched by the user. For example, suppose the user initiates the recording of content (e.g., either by pressing a "record" button, pressing and holding a "record" button, or issuing a voice command). The content being recorded may be previewed in the window, thereby allowing the user to continue to watch the multimedia content from the output device at the same time as reviewing the content that he or she is recording and/or would to share.

An overlaid window, for instance, may include an opaque or semi-transparent frame (or multiple frames) of the recorded content and/or information associated with the multimedia content. In embodiments, the overlay may be located in a corner of the display screen so as to minimize disruption of the continuous playback of content. The overlay may be temporary (e.g., automatically disappear after a certain time interval has passed) or may disappear in response to a user input. The overlay may further include selectable interface elements (e.g., via user interface logic 416) that permit a user to select content for sharing, edit content using interactive editor 516, and/or share the content with another user. In yet another embodiment, capture logic 506 may be configured to pause the playback of the content upon recording multimedia content in response to a user instruction, enabling the user to share the content if desired.

In other embodiments, upon recording content provided by an output device, another electronic device (e.g., a smartphone, tablet, or other computing device coupled to switching device) may access the recorded multimedia content through a suitable user interface (e.g., an application) on the electronic device. In this manner, a user may be able to access, view, and/or share multimedia content recorded on switching device 404 without utilizing user interface logic 416. In an example, upon recording multimedia content in one of the manners described above, a user may access the recorded content on another device (e.g., a smartphone) while continuing to watch/listen to content provided by the output device. Accordingly, continuous playback of the multimedia content on one of electronic devices 402D or 402E need not be interrupted. Rather, a user may utilize separate interface to access the recorded content, and view/share such content using the other device in accordance with techniques described herein.

In step 604, a selection is received of a portion of the multimedia content for sharing. For instance, with reference to FIG. 5, capture logic 506 may be configured to receive a selection to share a portion of multimedia content with one or more users. Capture logic 506 may receive the selection via a user input, e.g., in response to a user interacting with control device 406 or issuing voice command 408 to switching device 404.

In embodiments, the selection may be carried out in a number of ways. For example, where an overlay is displayed on a screen (e.g., via electronic devices 402D or 402E), a user may interact, via user interface logic 416, with the overlay to select content being viewed and/or content previously being recorded (e.g., displayed in the overlay) for sharing. In another embodiment, a user may browse a list of previously recorded portions (e.g., clips) of multimedia content stored in storage(s) 420, or accessible via switching device 404 if stored remotely. Accordingly, a user may interact with user interface logic 416 to select any one of the portions of multimedia content previously recorded for sharing. In yet another embodiment, discussed later, a user may edit a previously recorded clip via interactive editor 516 and select an edited version of the multimedia content for sharing.

In yet another embodiment, a user may select a portion of multimedia content currently being presented for sharing with another user. For instance, a user may select content for sharing without previously recording the content. As an example, while watching certain multimedia content, a user may decide that an interesting scene was presented. A user may thereby interact with control device 406 or issue a voice command 408 to select the portion of content being presented for sharing with another user. In this manner, regardless whether a user has previously recorded multimedia content, interactive sharing logic 502 may still enable a user to share multimedia content (e.g., via at least a user-interactive identifier and/or information associated with the content) with another user.

In step 606, information associated with the portion of the multimedia content for sharing is determined. For instance, with reference to FIG. 5, content identifier 510 may be configured to determine various types of information associated with the portion of the multimedia content (apriori, or in accordance with content recognition techniques described later). In embodiments, content identifier 510 may determine or obtain any information corresponding, or otherwise associated with, the portion of the multimedia content. Because switching device 404 is a smart switching device that can interact with electronic devices 402A-402C (e.g., sources of the multimedia content) and/or analyze signals received therefrom, content identifier 510 can automatically determine information associated with the content viewed by the user upon selection of the portion of the multimedia content.

In one example, content identifier 510 may determine metadata information associated with the multimedia content (e.g., a date/time of recording, a name of the multimedia content or programming, such as a TV show's name, a description of the content, name(s) of the actor(s) of the multimedia content, metadata specifying a content identification (ID), or otherwise any other information regarding the content). In another example, content identifier 510 may determine a service providing the multimedia content. For instance, content identifier 510 may determine that the multimedia content was obtained from a streaming media service (e.g., an application such as Netflix®) or obtained from a subscribed channel through a STB. In another example, content identifier 510 may determine a source device (e.g., an AppleTV®, a Roku® device, a STB, a Blu-ray player, etc.) providing the multimedia content. In yet another example, content identifier 510 may determine, a time index associated with the multimedia content. For instance, a time index may include a starting time, an ending time, and/or a run time for the multimedia content (e.g., 2:35 to 2:55). In another example, content identifier 510 may determine a unique identification assigned to the multimedia content by the service providing the multimedia content (e.g., a name or other identifier associated with the multimedia content, a season and/or episode number, a description, summary, or overview of the multimedia content, etc., a unique ID assigned to the content by the provider providing the content). Content identifier may further determine or one or more other services or providers that provide the multimedia content. For example, content identifier 510 may determine if additional services (e.g., other applications, source devices, and/or subscribed channels) may provide access to the portion of the multimedia content. In this manner, content identifier 510 may automatically determine whether more than one service provides access to the multimedia content, and optionally share an interactive identifier (discussed later) for each additional service.

It is noted that the information described herein that content identifier 510 may determine is illustrative only. In accordance with embodiments, content identifier 510 may determine any other type of information associated with the multimedia content as will be appreciated by those skilled in the art. For example, audio and/or video fingerprinting may be used to match content to a cloud database, e.g., via a hash comparison to an identifier of the content.

In step 608, a selection of one or more users with which to share the portion of the multimedia content is received. For example, with reference to FIG. 5, sharing logic 514 may be configured to receive (e.g., from a user), a selection of a user, or users, to share multimedia content. The selection of the user(s) may be obtained in a similar manner as described above, e.g., via control device 406 or via voice command 408.

In embodiments, sharing logic 514 may be configured to provide an interface (e.g., via user interface logic 416) in which a user may navigate to carry out the selection of one or more users. For instance, an overlay that appears on a display screen may provide interface elements in which a user may select one or more users to share the selected of multimedia content with. In another embodiment, sharing logic 514 may provide an interface in which a user may browse a list of previously recorded portions of multimedia content and select one or more users to share selected clips with.

Sharing logic 514 may receive a selection to share multimedia content (e.g., via a user-interactive identifier where the content may be accessed, information associated with the content, or the file containing the multimedia content) in a number of ways. For example, sharing logic 514 may receive a command to share the portion of multimedia content with a plurality of users via the user's social media account (e.g., via the user's Facebook® account, Twitter® account, Instagram® account, etc.). In accordance with another embodiment, sharing logic 514 may receive a command to share the portion of multimedia content by transmitting the content directly to another device. For example, a user may desire to send a user-interactive identifier or a file comprising the audio/video content directly to certain device or devices (e.g., a computer, a tablet, a smart phone, etc.). In one example, a user may select an option to share the content (e.g., a user-interactive identifier, a video file, an audio file, or a frame or GIF extracted from the portion of the multimedia content) to user's own mobile phone (or other electronic device) and/or other users' mobile phones (or electronic devices). In accordance with embodiments, the selection of one or more users may comprise selecting a phone number (e.g., to share the content via a text message), an e-mail address, or any other unique identifier (e.g., IP address, Media Access Control (MAC) address, or any other user/device identifier or address) suitable for routing the content to another user.

In step 610, a user-interactive identifier and at least one of the information or the portion of the multimedia content is transmitted to the one or more selected users. For example, with reference to FIG. 4, a transmitter, such as network interface 424, may be configured to transmit the user-interactive identifier, at least the information determined by content identifier 510 or the portion of the multimedia content to one or more users (e.g., user(s) of electronic device(s) 426).

In accordance with embodiments the multimedia content may be transmitted in a number of ways. For instance, network interface 424 may be configured to transmit a user-interactive identifier to the one or more electronic device(s) along with information associated with the multimedia content and/or the portion of the multimedia content. In embodiments, the user-interactive identifier, when activated, may be configured to cause at least one of the content and the information to be accessed by user(s) of electronic device(s) 426.

In accordance with one or more embodiments, the user-interactive identifier is a URL. In accordance with such an embodiment, the URL may be provided as a hyperlink to the other user in a message (e.g., a text message, an e-mail, etc.). Upon activating the hyperlink via electronic device(s) 426 (e.g., a computer, smart phone, etc.), the user may be access the multimedia content and/or associated information. Activation of the hyperlink may further cause electronic device(s) 426 to play the multimedia content. In embodiments, playback of multimedia content upon activation of the user-interactive identifier may commence at the beginning of the multimedia content (e.g., the starting of a movie or television program). In other embodiments, playback may be resumed from a point in time associated with a time index discussed herein, enabling the user to view or listen to certain specified content. For instance, if the time index indicates that the shared content represents times 2:35 through 2:55 of the multimedia content, then playback may begin at time 2:35 and/or end at time 2:55.

Accordingly, the user(s) of electronic device(s) 426 receiving the user-interactive identifier, associated information, and the portion of the multimedia content is able to watch or listen to the transmitted clip, as well as launch the multimedia content on electronic device(s) 426 upon activating the hyperlink. For example, upon activating the hyperlink, the content and/or associated information may be accessed at the location corresponding to the hyperlink and downloaded to the user's device (e.g., electronic device 426) and/or played back via the device irrespective of the user's or device's location.

In other embodiments, the user-interactive identifier may comprise a hyperlink causing the multimedia content to be launched on a separate device. For instance, in an embodiment, activating a hyperlink on one of electronic device(s) 426 (e.g., a smartphone or a computing device) may automatically cause another device associated with the smartphone (e.g., a switching device or another computing device, such as a tablet on the same local area network) to launch the multimedia content. In another embodiment, the user-interactive identifier may be transmitted directly from one switching device 404 to another switching device 404 (e.g., on the same local network or on a different local network), which when activated, causes the other switching device to launch the multimedia content. In yet another embodiment, activating a user-interactive identifier may further cause a message to be displayed to a user indicating, e.g., that the multimedia content will be launched on another device (e.g., a Roku® device) and instructing the user to power on a display and/or switch an appropriate input of the display to view the content.

In some instances, a user-interactive identifier causing the multimedia content to be launched may not be immediately available at the time a portion of multimedia content is recorded. For example, if a user selects a live television program to share, the user-interactive identifier, in certain instances, may enable another user upon activation of the hyperlink to access the live television program if an online streaming service for the channel is available. However, in many instances, live television broadcasts are not available online. In such situations, the user-interactive identifier, when activated, may nevertheless cause a website to be launched containing information associated with the live television broadcast (e.g., a website containing a description of television show, or a website containing the score and/or play-by-play summary for a live sports game). In other situations, the television broadcast may become available at a later time (e.g., through a video-on-demand (VOD) service). In such a situation, content identifier 510 may obtain a user-interactive identifier to the VOD service, such that when the multimedia content is shared by a user at a later date, the hyperlink to the VOD service may be transmitted along with the associated information and/or the clip of the multimedia content. Accordingly, as time goes on, the user-interactive identifier (or other information obtained by content identifier 510) may be updated with little to no user involvement.

In embodiments, associated information transmitted along with the user-interactive identifier may be used determine which provider is to playback the content. For example, suppose that a user of switching device 404 shares video content viewed from streaming multimedia player 402C (e.g., via a Netflix® application), but the receiving person does not have a Netflix® account. In this situation, the associated information may identify whether the video content can be played back using a different service to which the receiving person subscribes (e.g., Amazon Prime®, Hulu®, etc.). For example, if the receiving user has a subscription to Amazon Prime® and the associated information indicates that shared video content is also available on Amazon Prime®, the video content may be played back using Amazon Prime® upon activation of the user-interactive identifier.

In other embodiments, along with the user-interactive identifier and/or the information associated with the multimedia content, the portion of the multimedia content may be transmitted. For instance, the portion of the multimedia content may be transmitted as a video or audio file in any known or native format (e.g., .mov, .mp4, .avi, .wmv, .3gp, .mkv, .mp3, .wav, .wma, etc.). In another embodiment, the portion of the multimedia content may be transmitted as a single frame in any known image format (.jpg, .gif, .bmp, .png, .tiff, etc.). In yet another embodiment, the portion of the multimedia content may be transmitted in accordance with an animated GIF derived from the portion of the multimedia content, or any other format lacking audio.

In embodiments, the portion of the multimedia content transmitted to electronic device(s) 426 may be transmitted in an uncompressed or a compressed format. For instance, the portion of the multimedia content may be compressed to reduce a transmission time and/or decrease the bandwidth required for quick transmissions. In another embodiment, switching device 404 may automatically limit a size of the portion of multimedia content to be transmitted by, e.g., capping a file size and/or limiting the transmitted multimedia content to a certain length (e.g., 5 seconds, 10 seconds, 20 seconds, etc.). In this manner, switching device 404 may prevent a user from transmitting an entire television show or movie to another device, but rather only enables the transmission of short video clips or even a single frame.

In accordance with techniques described herein, the portion of the multimedia content may additionally contain a watermark or other similar identifier or marking. For instance, the watermark may comprise an identity of switching device 404 transmitting the portion of the multimedia content, information obtained from content identifier 510, or any other information.

Although it is described herein that network interface 424 may be utilized to communicate with one or more electronic device(s) 426, it is understood that transmissions are not so limited. Interactive sharing logic 502 may enable the sharing of the user-interactive identifier, the information associated with the multimedia content, and the multimedia content with one or more electronic device(s) 426 via any suitable communication protocol, including but not limited to any suitable type of RF communication (e.g., Bluetooth™, as described in the various standards developed and licensed by the Bluetooth™ Special Interest Group, technologies such as ZigBee® that are based on the IEEE 802.15.4 standard for wireless personal area networks, NFC, other RF-based or IP-based communication technologies such as any of the well-known IEEE 802.11 protocols, etc.) or non-RF communication (e.g., IR).

It is noted that the above techniques enable a user to selectively share and/or record portions multimedia content without affecting or disturbing playback of the content. For example, because the recording (e.g., via capture logic 506) may be accomplished with a simple command from a control device 406 or a voice command, and user interface logic 416 may enable the sharing of the multimedia content via an overlay presented on the display device, each of operations 602, 604, 606, 608, and/or 610 of flowchart 600 may be performed while the multimedia content is continuously provided on a display device without interruption.

In some example embodiments, one or more of operations 602, 604, 606, 608, and/or 610 of flowchart 600 may not be performed. Moreover, operations in addition to or in lieu of operations 602, 604, 606, 608, and/or 610 may be performed. Further, in some example embodiments, one or more of operations 602, 604, 606, 608, and/or 610 may be performed out of order, in an alternate sequence, or partially (or completely) concurrently with each other or with other operations.

Figure 7:
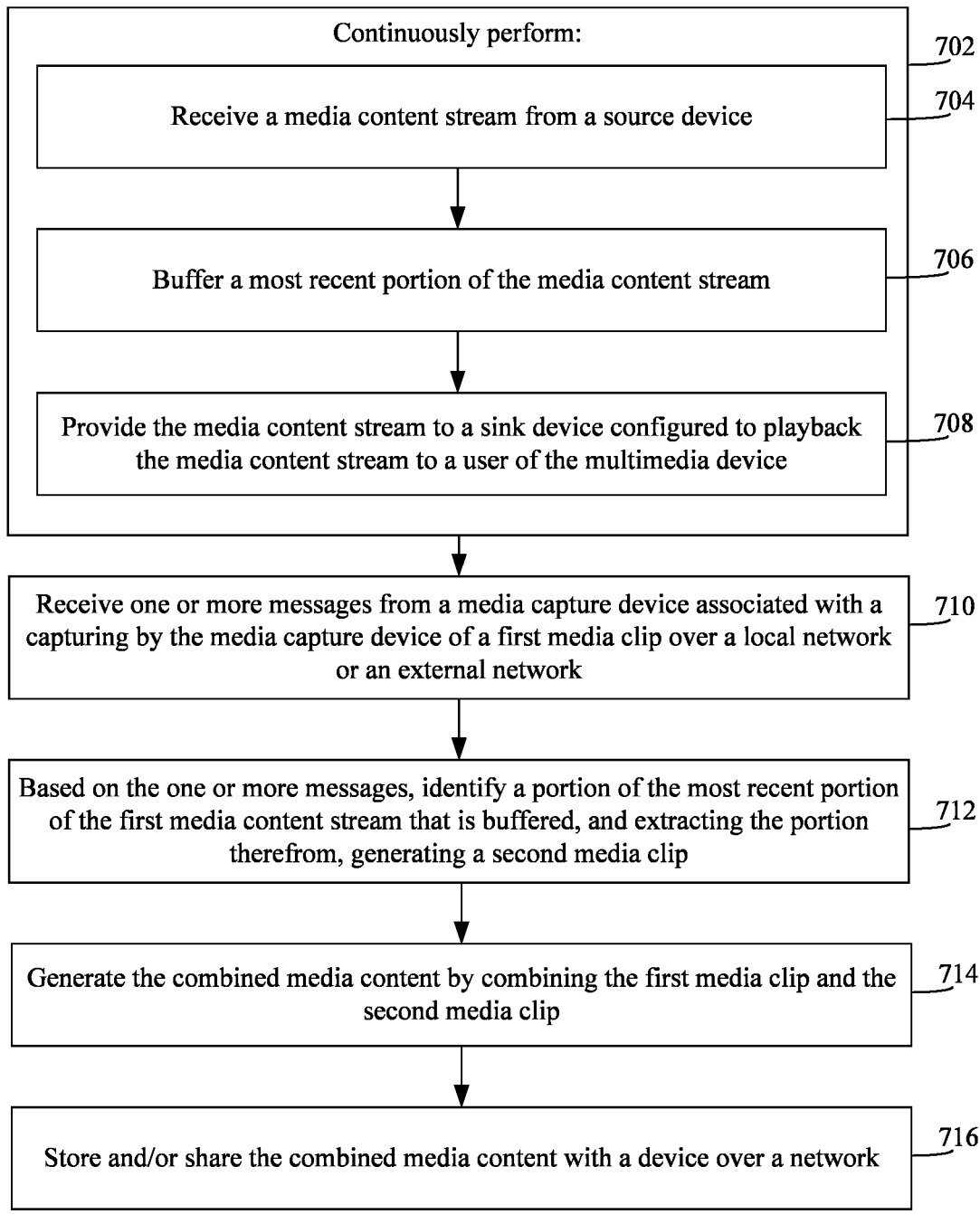
FIG. 7 depicts a flowchart of a method for the generating of combined multimedia content in accordance with an embodiment.

Referring now to FIG. 7, a flowchart 700 of a method performed by a switching device that enables generation of combined media content is shown, in accordance with an embodiment. The method of flowchart 700 may be implemented by system 400 as described above in reference to FIG. 4, combination logic 518 as described above in reference to FIG. 5, and/or interactive sharing logic 502 as described above in reference to FIG. 5. Other structural and operational embodiments will be apparent to persons skilled in the relevant art(s) based on the following discussion regarding flowchart 700, system 400, combination logic 518, and interactive sharing logic 502.

Flowchart 700 begins with step 702. At step 702, one or more operations are continuously performed. For example, one or more of step 704, step 706, and/or step 708 are continuously performed by system 400, combination logic 518, and/or interactive sharing logic 502, according to embodiments.

In step 704, a media content stream is received from a source device. For instance, a source device as described herein, e.g., with respect to system 400, is configured to provide media/multimedia content for playback to a user.

In step 706, a most recent portion of the media content stream is buffered. For example, buffer(s) 504 of FIG. 5 and/or media buffer 434 of FIG. 4 are configured to buffer a most recent portion of the content stream received in step 704. That is, as described herein, a buffer is configured to store the most recent N seconds of content that is played-back for viewing by a user(s).

In step 708, the media content stream is provided to a sink device configured to playback the media content stream. For instance, a TV, a projector, or another type of device with a display may be configured to playback the media content stream (e.g., TV 402D of FIG. 4).

In step 710, one or more messages are received from a media capture device pertaining to the capturing by the media capture device of a first media clip. For example, a media capture device such as media capture device 432 of FIG. 4 is configured to provide such messages. In embodiments, these messages are associated with and include information related to the capturing of real-time media clips by the media capture device. In one example, a captured media clip may be of a user(s) reaction to or emotions associated with the playback the media content stream, and may be initiated and/or finished based on the reaction and/or emotions as determined by the media capture device. In other examples, a user selection in a user interface of a control device or smart phone, or voice command, may be used to initiate and/or finish the capture of the real-time media clip.

In step 712, based on the one or more messages, a portion of the buffered most recent portion of the first media content stream is identified and the portion is extracted therefrom to generate a second media clip. For instance, combination logic 518 and/or interactive sharing logic 502 may be configured to identify a portion of the most recent buffered content that corresponds to the captured media clip of step 710 based on the messages received from media capture device 432. In embodiments, aligner 520 of combination logic 518 is configured to identify the buffered most recent portion of the first media content stream based on the messages. The identified portion may be extracted by capture logic 506, as similarly discussed above for content sharing embodiments. As an example, the received messages may include timestamps associated with the beginning and/or the end of the captured real-time media clip described above, and capture logic 506 and/or aligner 520 may be configured to identify and extract a corresponding portion of the buffered media/multimedia content based on the timestamps to generate the second media clip in a way such that it temporally corresponds to the first media clip of step 710. In some embodiments, the audio signal of the buffered content may be used to match with the captured audio to identify the portion of the buffered most recent portion of the first media content stream to be extracted for the second media clip.

In step 714, combined media content is generated by combining the first media clip and the second media clip. For example, combination logic 518 is configured to generate such combined media content. In embodiments, aligner 520 of combination logic 518 is configured to align or validate alignment of the first media clip and the second media clip such that the clips are synchronized or temporally aligned with respect to absolute time. In embodiments, combination logic 518 is configured to generate combined media content via combiner 522 by stitching, overlays (e.g., overlaying the captured real-time media clip(s) on a part of the identified portion of the most recent buffered content that corresponds thereto, or vice versa), side-by-side positioning, and/or the like, including variations on opacity and sizes with respect to the first and second media clips.

In step 716, the combined media content is stored. For instance, the generated combined media content may be stored in a storage or memory as described herein, including in system 400 of FIG. 4, in a cloud-based storage, and/or the like. Thus, the combined media content is available for later playback and/or sharing, in embodiments. In an example, the combined media content is shared with other users as similarly described for selected media content above with respect to flowchart 600 of FIG. 6, e.g., with hyperlinks directed to attributes of the streamed media content that was being played-back.

Further embodiments are also contemplated herein for generating combined media content. For example, a media capture device may operate proactively and/or reactively, in embodiments. In proactive examples, a media capture device may continuously capture a real-time media clip via a buffer, as similarly described herein for switching devices, rather than waiting for indicia of initiation for capturing clips. In such examples, user interactions with an interface, voice commands, emotion or reaction determinations, and/or the like, provide the points in time at which portions of the capture performed by the media capture device are identified/selected as desired portions for generating combined media content. In reactive examples, the capture performed by the media capture device is in accordance with flowchart 700 of FIG. 7, and user interactions with an interface, voice commands, emotion or reaction determinations, and/or the like, cause the capture to be performed.

Additionally, embodiments are not limited to single user/group captures by a single media capture device. Embodiments herein contemplate that multiple users/groups at different locations may consume the same played-back content from a source device, e.g., from a set top box, streaming service, etc., where each user/group individually captures real-time media clips that are then combined in accordance with the described embodiments. Likewise, multi-part or multi-episode embodiments are also contemplated in which combined media content is generated, either serially or concurrently, based on captured real-time media clips for different portions of buffered content from a source device. These different portions may comprise portions of one program or episode, different portions of different programs or episodes, and/or the like.

It is also contemplated that combination logic described herein, or other parts of the systems and devices in embodiments, includes logic (hardware and/or software) through witch noise cancellation of played-back media is utilized to monitor for reaction/emotion of a user(s).

Moreover, embodiments herein take user privacy into account and may only persistently store captured media clips based on express (e.g., a user opts-in for combining content embodiments) or implied (user selects to capture a real-time media clip) user consent. The restriction of length and or size of generate combined media content is also contemplated with respect to user privacy and/or system limitations.

Figure 8:
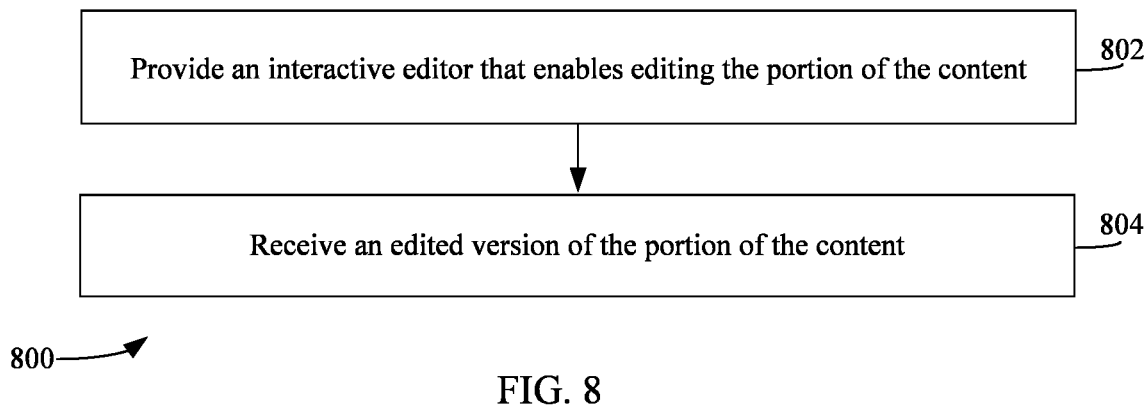
FIG. 8 depicts a flowchart of a method for providing an interactive editor for editing multimedia content in accordance with an embodiment.

In accordance with embodiments disclosed herein, a portion of recorded multimedia content may be edited prior to sharing with another user. For instance, FIG. 8 depicts a flowchart 800 of a method performed by a switching device that enables editing, via an interactive editor, a portion of multimedia content in accordance with an embodiment. The method of flowchart 800 may be implemented by system 400 as described above in reference to FIG. 4 and interactive sharing logic 502 as described above in reference to FIG. 5. Other structural and operational embodiments will be apparent to persons skilled in the relevant art(s) based on the following discussion regarding flowchart 800, system 400, and interactive sharing logic 502.

Flowchart 800 begins with step 802. At step 802, an interactive editor is provided that enables a user to edit a portion of multimedia content. For instance, with reference to FIGS. 4 and 5, interactive editor 516 may be provided to a user, via user interface logic 416, enabling the user to edit a previously recorded multimedia clip. In accordance with embodiments, a user may launch interactive editor 516 by selecting an interface element, via user interface logic 416, displayed on a sink device (e.g., electronic devices 402D or 402E). For example, upon recording a short clip of multimedia content in accordance with the techniques described herein, an overlay may be presented on the display device that displays a frame (or frames) of the recorded multimedia content, along with an interface element(s) to share the portion of the recorded multimedia content (e.g., via a social media network or via another manner such as a text message or email) and an interface element to launch interactive editor 516. In other embodiments, a listing of previously recorded portions of multimedia content accessible via switching device 404 may contain an interface element to launch interactive editor 516 for a selected clip. Using control device 406 and/or voice command 408, a user may thereby select the interface element, causing interactive editor 516 to be launched on a display screen for any selected multimedia content.

In step 804, an edited portion of the content is received. Interactive editor 516 may be configured to provide an interface to edit a selected video (or audio) clip in a number of ways. For instance, interactive editor 516 may enable a user to edit a start time, an end time, and/or a length of the selected multimedia content. In another embodiment, interactive editor 516 may enable a user to extract an animated GIF or a single frame to share with another user. In another example, interactive editor 516 may allow a user to alter a video and/or audio quality prior to sharing the clip with another user in accordance with techniques described herein. Interactive editor 516 may also be configured to provide additional content editing features known and appreciated to those skilled in the art, and are not limited to the illustrative embodiments described herein.

For example, upon launching interactive editor 516 for a particular item of selected multimedia content, user interface logic 416 may cause the selected content to be enlarged on the screen. The user may then be enabled to select which portion(s) of the recorded content are to be saved and/or shared (e.g., by using an interface element, such as a slider, that enables the user to select a starting point and/or an ending point of the content to be saved or shared). The user may further be enabled to select single frames to be saved or shared from the selected content.

Upon editing a selected portion of multimedia content, a user of switching device 404 may store the edited portion in storage(s) 420 (or another storage) and/or may share the edited portion with another in a manner as described above upon the edited version of the portion of the content being received therefor in step 804.

Figure 9:
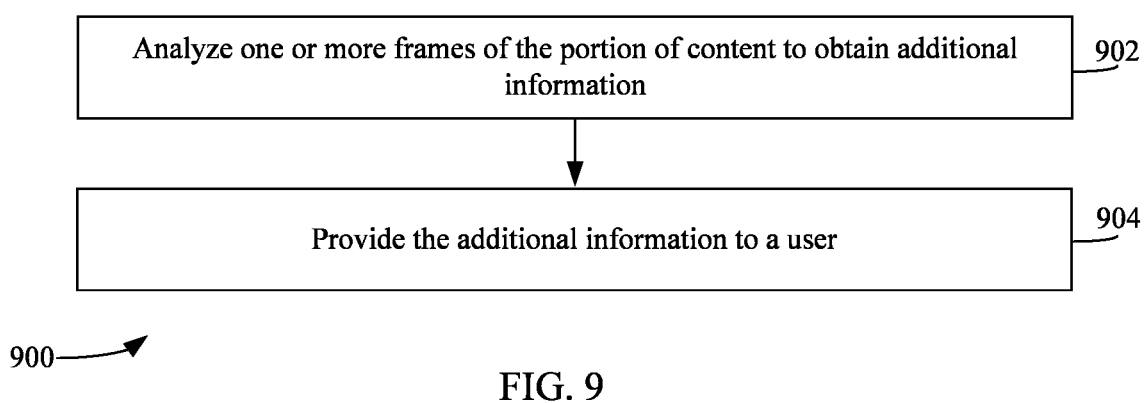
FIG. 9 depicts a flowchart of a method for obtaining additional information corresponding to multimedia content in accordance with an embodiment.

In accordance with an embodiment, interactive sharing logic 502 may be further configured to perform content recognition for portions of recorded multimedia content. For instance, FIG. 9 depicts a flowchart 900 of a method performed by interactive sharing logic 502 to analyze content to obtain additional information about the content in accordance with an embodiment. The method of flowchart 900 may be implemented by system 400 as described above in reference to FIG. 4 and interactive sharing logic 502 described above in reference to FIG. 5. Other structural and operational embodiments will be apparent to persons skilled in the relevant art(s) based on the following discussion regarding flowchart 900, system 400, and interactive sharing logic 502.

Flowchart 900 begins with step 902. At step 902, one or more frames of a portion of multimedia content are analyzed to obtain additional information. For instance, with reference to FIG. 5, content analyzer 512 may be configured to extract one or more frames from a portion of multimedia content recorded according to techniques described above. Upon extracting one or more frames, content analyzer 512 may use content recognition techniques to obtain information regarding the content within the one or more extracted frames. In an embodiment, while one or more processors of switching device 404 may be configured to carry out functions of content analyzer 512 to analyze content within extracted frames, it is understood that one or more processors of a remote device (e.g., a cloud-based server) may carry out the functions of content analyzer 512. Given that content recognition can entail greater processing requirements, utilizing a remote device to carry out such functions may enable content analyzer 512 to analyze frames quicker, thus optimizing a user experience of switching device 404.

Content analyzer 512 may analyze one or more extracted frames to obtain a wide variety of additional information relating to recorded multimedia content. In one embodiment, content analyzer 512 may identify additional multimedia content related to the one or more portions of multimedia content. For example, content analyzer 512 may identify additional television shows, movies, and/or programming containing content similar to the extracted content (e.g., similar genres, themes, plots, cast members, directors, producers, etc.). In another illustrative example, content analyzer 512 may identify other short video clips accessible via network interface 424 (e.g., via a number of video hosting platforms, such as YouTube®, or recorded on another user's multimedia switching device). For instance, if a user recorded a clip of an interesting sports play (e.g., a touchdown in a football game or a slam dunk in a basketball game) in accordance with techniques described above, content analyzer 512 may identify similar sports plays (e.g., similar touchdowns or slam dunks) available online or recorded on another user's switching device. In another embodiment, content analyzer 512 may also be configured to identify additional camera angles of the same sports plays (e.g., different views of the same touchdown or slam dunk).

In another embodiment, content analyzer 512 may determine a brand or type of product (e.g., shoes, beverages, vehicles, electronic devices, clothing, etc.) contained within one or more portions of recorded multimedia content. In yet another embodiment, content analyzer 512 may analyze one or more frames of recorded content to identify an actor or actress present in the recorded content. In yet another embodiment, content analyzer 512 may identify a filming location of a portion of recorded multimedia content using the content recognition techniques described herein. It is noted that the additional information described above that may be obtained by content analyzer 512 are only illustrative. In accordance with embodiments, content analyzer 512 may obtain any other type of additional information relating to the recorded multimedia content as will be appreciated by those skilled in the art.

In embodiments, content analyzer 512 may be configured to automatically analyze multimedia content without an explicit user instruction. For instance, content analyzer 512 may automatically analyze each clip upon recording the clip in accordance with techniques described. While a user ultimately may not share each recorded clip with one or more users, content analyzer 512 may nevertheless analyze each recorded clip to obtain additional information as described above, e.g., to locate additional content or to target advertisements or recommendations to the user based on the types of content that the user has chosen to record.

In an embodiment, content analyzer 512 may be further configured to continuously analyze each portion of multimedia content recorded in accordance with the above techniques to obtain additional information. For example, given that additional content available via the Internet is constantly growing, the relevance of information extracted by content analyzer 512 for a given clip may change over time. For instance, additional information and/or metadata associated with a given clip may be obtained in the hours, days, or weeks following a user's recording of the clip. Accordingly, content analyzer 512 may be configured to repeatedly (e.g. at predetermined intervals or at random intervals) analyze recorded multimedia clips to determine if additional information may be obtained for the clip. In embodiments, the longer the time that passes, the more information that may be obtained by content analyzer 512 for a given clip of multimedia content.

In another embodiment, content analyzer 512 may be located remotely (e.g., on a cloud-based server) to analyze users' recorded multimedia content. In this scenario, given that content analyzer 512 may be configured to analyze content for a plurality of switching devices 404, content analyzer 512 may determine that certain multimedia content (or content contained within users' recorded content) is commonly recorded by a plurality of users. Accordingly, content analyzer 512 may determine that such content is of high interest to its users, and as a result content analyzer 512 may perform additional processing (e.g., more aggressive content recognition) on the content.

In step 904, the additional information is provided to a user. For instance, with reference to FIG. 4, additional information obtained by content analyzer 512 may be provided to a user in a number of ways. In one embodiment, content analyzer 512 may provide the additional information via user interface logic 416 presented on a display device (e.g., electronic device 402D or 402E). For instance, a display device may display the additional information alongside a frame representing the recorded content. In another embodiment, the additional information may be displayed to a user in response to a user selecting a particular item of recorded multimedia content. In another embodiment, the additional information may be transmitted to a user's electronic device (e.g., one of electronic device(s) 426) automatically (e.g., along with the portion of the multimedia content shared with the user) or in response to a user request to transmit the additional information.

In other embodiments, the additional information may be displayed to a user apart from the recorded multimedia content (e.g., for targeted advertisements based on a user's recorded content). In yet embodiments, for instance, related multimedia content identified by content analyzer 512 may be displayed to a user in a separate user interface screen of switching device 404 (e.g., on a separate screen containing recommended content for a particular user based on a viewing and/or a recording history).

In some example embodiments, one or more of operations 902 and/or 904 may not be performed. Moreover, operations in addition to or in lieu of operations 902 and/or 904 may be performed. Further, in some example embodiments, one or more of operations 902 and/or 904 may be performed out of order, in an alternate sequence, or partially (or completely) concurrently with each other or with other operations.

In accordance with embodiments disclosed herein, multimedia content recorded using the techniques described above may be stored, along with additional information relating to the recorded content. For instance, FIG. 10 depicts a flowchart 1000 of a method performed by an exemplary switching device that stores content and information associated with the content in accordance with an embodiment. The method of flowchart 1000 may be implemented by system 400 as described above in reference to FIG. 4 and interactive sharing logic 502 described above in reference to FIG. 5. Other structural and operational embodiments will be apparent to persons skilled in the relevant art(s) based on the following discussion regarding flowchart 800, system 400, and interactive sharing logic 502.

Flowchart 1000 begins with step 1002. In step 1002, one or more portions of multimedia content provided by an output device is recorded. For instance, capture logic 506 may record portions of multimedia content in response to a user input, as discussed above with reference to step 602 of FIG. 6.

In step 1004, the one or more portions of multimedia content are stored. For instance, with reference to FIG. 4, the one or more portions of recorded multimedia content, along with information determined via content identifier 510, a frame or image associated with recorded multimedia content, and/or an animated GIF derived from the recorded multimedia content in accordance with techniques described herein may be stored locally (e.g., in storage(s) 420), and/or may be stored on a remote device (e.g., a smartphone or a cloud-based server), as discussed above. In embodiments, a user may store a plurality of clips while viewing or listening to multimedia content provided by an output device, irrespective of whether the user has shared the clips with one or more users. For example, a user may wish to record several clips while watching certain multimedia content, but may not decide which ones, if any, to share until a later time (e.g., after the multimedia content has ended). Upon the conclusion of the multimedia content, the user may access a listing of all the clips previously recorded, at which point the user may decide to share one or more clips, delete one or more clips, and/or save one or more clips to view or share later.

For instance, when accessing previously stored clips, user interface logic 416 may provide a frame (e.g., the first video frame) associated with each clip of recorded multimedia content. A user may interact with user interface logic 416 using the above techniques (e.g., via a control device 406 or voice command 408) to select a particular clip of recorded multimedia content. In embodiments, upon selecting a particular clip, the frame associated with the selected clip may be enlarged on the display device (e.g., electronic device 402D or 402E). The display device may also provide selectable interface elements to share (e.g., via social media or with one or more users) the multimedia content or edit the multimedia content, in accordance with the above described techniques.

In embodiments, user interface logic 416 may further be configured to cause the display device to display information (e.g., metadata or other information obtained by content identifier 510) associated with each clip of recorded multimedia content.

In step 1006, one or more frames of the portions of multimedia content are analyzed to obtain additional information. For instance, content analyzer 512 may analyze frames from portions of recorded multimedia content, as discussed above with reference to step 802 of FIG. 8.

In step 1008, the additional information is stored. For example, with reference to FIG. 4, additional information from content analyzer 512 may be stored along with each clip of recorded multimedia content in a manner as described above (e.g., locally or in a remote storage device). In embodiments, additional information obtained from content analyzer 512 may be stored as metadata or any other manner so as to associate the additional information with a particular recorded clip. In this manner, a user searching recorded clips accessible via switching device 404 may search not only the clip and associated information (e.g., from content identifier 510), but may also search the additional information obtained from content analyzer 512. As an illustrative example, if a user decides to search switching device 404 for a particular type of sports play (e.g., touchdowns or slam dunks), switching device 404 would identify all recorded clips that contained the particular type of sports play based on metadata obtained from content analyzer 512.

In some example embodiments, one or more of operations 1002, 1004, 1006, and/or 1008 may not be performed. Moreover, operations in addition to or in lieu of operations 1002, 1004, 1006, and/or 1008 may be performed. Further, in some example embodiments, one or more of operations 1002, 1004, 1006, and/or 1008 may be performed out of order, in an alternate sequence, or partially (or completely) concurrently with each other or with other operations.

FURTHER EXAMPLE EMBODIMENTS

As described, systems and devices embodying the techniques herein may be configured and enabled in various ways to perform their respective functions for generating synchronized combinations of captured real-time media content with played-back digital content, and/or the sharing, storing, and/or playback thereof. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

It should be noted that while illustrated embodiments are described by way of example with respect to switching devices and/or HDMI switching devices, e.g., switching device 104 and/or embodiments thereof, the embodiments contemplated herein are not so limited and are applicable to other types of systems and devices associated with receiving and playing back media/multimedia content.

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

The multimedia content sharing embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 11:
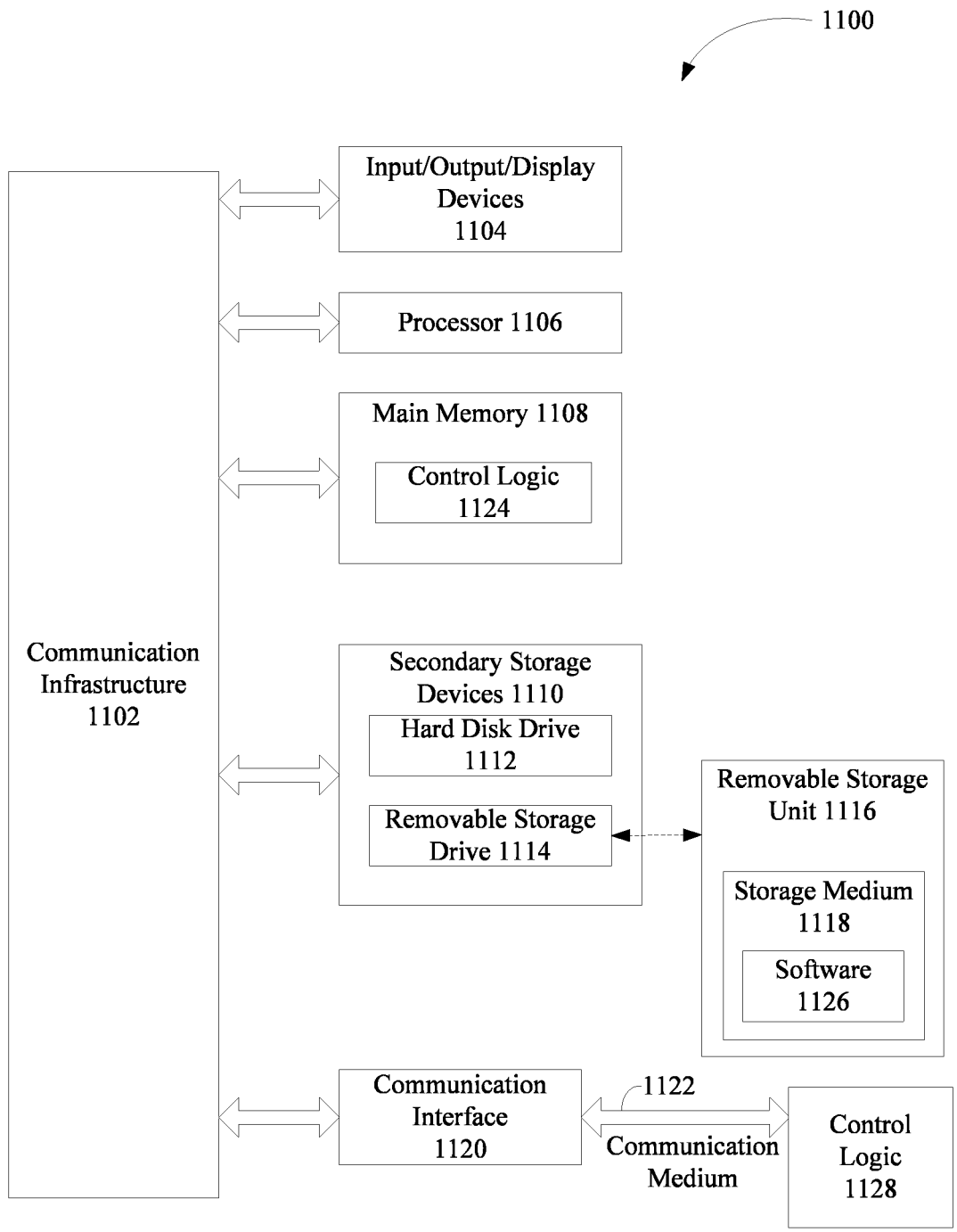
FIG. 11 is a block diagram of a computer system in accordance with an embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 1100 shown in FIG. 11. It should be noted that computer 1100 may represent communication devices, processing devices, servers, and/or traditional computers in one or more embodiments. For example, systems and devices described herein, or any of the sub-systems, components or subcomponents respectively contained therein, may be implemented using one or more computers 1100.

Computer 1100 can be any commercially available and well-known communication device, processing device, and/or computer capable of performing the functions described herein, such as devices/computers available from International Business Machines®, Apple®, Sun®, HP®, Dell®, Cray®, Samsung®, Nokia®, etc. Computer 1100 may be any type of computer, including a desktop computer, a server, etc.

Computer 1100 includes one or more processors (also called central processing units, or CPUs), such as a processor 1106. Processor 1106 is connected to a communication infrastructure 1102, such as a communication bus. In some embodiments, processor 1006 can simultaneously operate multiple computing threads.

Computer 1100 also includes a primary or main memory 1108, such as random access memory (RAM). Main memory 1108 has stored therein control logic 1124 (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such a USB interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1118 having stored therein computer software 1126 (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well-known manner.

Computer 1100 also includes input/output/display devices 1104, such as touchscreens, LED and LCD displays, monitors, keyboards, pointing devices, etc.

Computer 1100 further includes a communication or network interface 1120. Communication interface 1120 enables computer 1100 to communicate with remote devices. For example, communication interface 1120 allows computer 1100 to communicate over communication networks or mediums 1122 (representing a form of a computer useable or readable medium), such as LANs, WANs, the Internet, etc. Network interface 1120 may interface with remote sites or networks via wired or wireless connections.

Control logic 1128 may be transmitted to and from computer 1100 via the communication medium 1122.

Any apparatus or manufacture comprising a computer useable or readable medium having control logic (software) stored therein is referred to herein as a computer program product or program storage device. This includes, but is not limited to, computer 1100, main memory 1108, secondary storage devices 1110, and removable storage unit 1116. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

Figure 12:
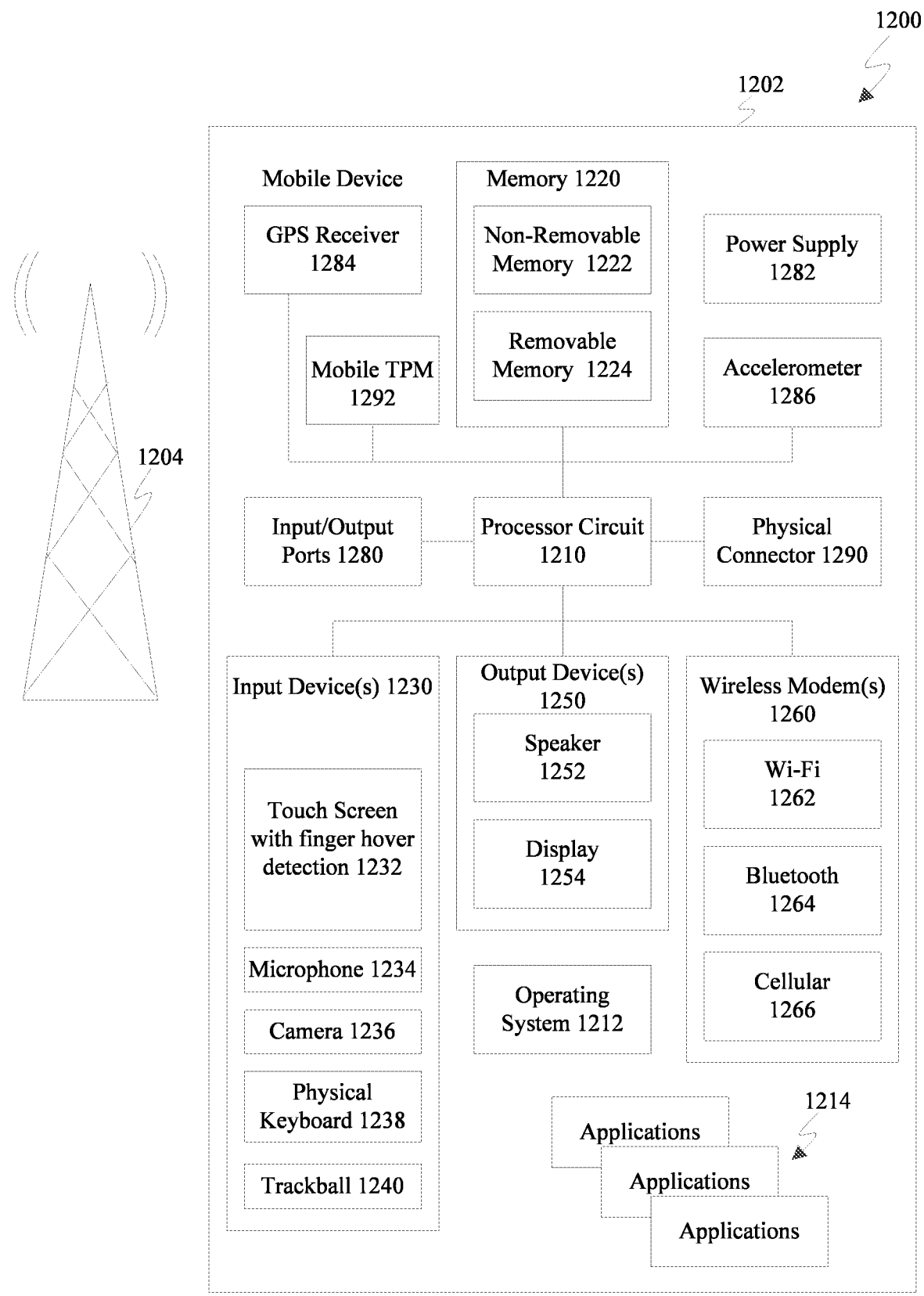
FIG. 12 is a block diagram of an example mobile device that may be used to implement embodiments.

FIG. 12 is a block diagram of an exemplary mobile system 1200 that includes a mobile device 1202 that may implement embodiments described herein. For example, mobile device 1202 may be used to implement any system, client, or device, or components/subcomponents thereof, in the preceding sections. As shown in FIG. 12, mobile device 1202 includes a variety of optional hardware and software components. Any component in mobile device 1202 can communicate with any other component, although not all connections are shown for ease of illustration. Mobile device 1202 can be any of a variety of computing devices (e.g., cell phone, smartphone, handheld computer, Personal Digital Assistant (PDA), etc.) and can allow wireless two-way communications with one or more mobile communications networks 1204, such as a cellular or satellite network, or with a local area or wide area network.

Mobile device 1202 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components of mobile device 1202 and provide support for one or more application programs 1214 (also referred to as "applications" or "apps"). Application programs 1214 may include common mobile computing applications (e.g., e-mail applications, calendars, contact managers, web browsers, messaging applications) and any other computing applications (e.g., word processing applications, mapping applications, media player applications).

Mobile device 1202 can include memory 1220. Memory 1220 can include non-removable memory 1222 and/or removable memory 1224. Non-removable memory 1222 can include RAM, ROM, flash memory, a hard disk, or other well-known memory devices or technologies. Removable memory 1224 can include flash memory or a Subscriber Identity Module (SIM) card, which is well known in GSM communication systems, or other well-known memory devices or technologies, such as "smart cards." Memory 1220 can be used for storing data and/or code for running operating system 1212 and application programs 1214. Example data can include web pages, text, images, sound files, video data, or other data to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1220. These programs include operating system 1212, one or more application programs 1214, and other program modules and program data. Examples of such application programs or program modules may include, for example, computer program logic (e.g., computer program code or instructions) for implementing one or more of the systems and devices described herein, along with any components and/or subcomponents thereof, as well as the flowcharts/flow diagrams described herein, including portions thereof, and/or further examples described herein.

Mobile device 1202 can include a mobile TPM 1292. Mobile TPM 1292 may be a mobile device equivalent embodiment of a TPM, as would be understood by one of skill in the relevant art(s) having the benefit of this disclosure. For example, mobile TPM 1292 may be configured to perform one or more functions or operations of TPMs for various embodiments herein.

Mobile device 1202 can support one or more input devices 1230, such as a touch screen 1232, a microphone 1234, a camera 1236, a physical keyboard 1238 and/or a trackball 1240 and one or more output devices 1250, such as a speaker 1252 and a display 1254. Other possible output devices (not shown) can include piezoelectric or other haptic output devices. Some devices can serve more than one input/output function. For example, touch screen 1232 and display 1254 can be combined in a single input/output device. Input devices 1230 can include a Natural User Interface (NUI).

One or more wireless modems 1260 can be coupled to antenna(s) (not shown) and can support two-way communications between processor 1210 and external devices, as is well understood in the art. Modem 1260 is shown generically and can include a cellular modem 1266 for communicating with the mobile communication network 1204 and/or other radio-based modems (e.g., Bluetooth 1264 and/or Wi-Fi 1262). At least one wireless modem 1260 is typically configured for communication with one or more cellular networks, such as a GSM network for data and voice communications within a single cellular network, between cellular networks, or between the mobile device and a public switched telephone network (PSTN).

Mobile device 1202 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components of mobile device 1202 are not required or all-inclusive, as any components can be deleted and other components can be added as would be recognized by one skilled in the art.

In an embodiment, mobile device 1202 is configured to implement any of the above-described features of flowcharts herein. Computer program logic for performing any of the operations, steps, and/or functions described herein may be stored in memory 1220 and executed by processor 1210.

The additional examples and embodiments described in this Section may be applicable to examples disclosed in any other Section or subsection of this disclosure.

CONCLUSION

While various embodiments have been described above, it should be understood that they have been presented by way of example only, and not limitation. It will be apparent to persons skilled in the relevant art(s) that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method performed by a multimedia device for generating combined media content, comprising:
   continuously performing:
      receiving a media content stream from a source device;
      buffering a most recent portion of the media content stream; and
      providing the media content stream to a sink device configured to playback the media content stream to a user of the multimedia device;
   receiving one or more messages from a media capture device associated with a capturing, by the media capture device, of a first media clip;
   based on the one or more messages, identifying a portion of the most recent portion of the media content stream that is buffered, and extracting the portion therefrom, generating a second media clip;
   generating the combined media content by combining first media content of the first media clip and second media content of the second media clip; and
   sharing the combined media content with a device over a network.

2. The method of claim 1, wherein the multimedia device comprises a switching device, and
   wherein the media capture device is associated with the user and is at least one of a smart phone, a camera that includes a microphone and that includes artificial intelligence programming configured to determine at least one of a reaction or an emotion of one or more persons in its field of view, or a stand-alone camera with a microphone.

3. The method of claim 1, wherein the one or more messages, and the first media clip, are received from the media capture device by the multimedia device via an external network with respect to the multimedia device.

4. The method of claim 1, wherein the one or more messages include temporal information associated with the first media clip;
   wherein said identifying the portion of the buffered most recent portion of the media content stream is based at least on the temporal information and includes aligning a beginning and a duration of the portion with a corresponding beginning and a duration of the first media clip with respect to absolute time.

5. The method of claim 1, wherein said combining the first media clip and the second media clip includes:
   overlaying an area of one of the first media clip or the second media clip with the other one of the first media clip or the second media clip; or
   stitching the first media clip and the second media clip.

6. The method of claim 1, wherein said sharing the combined media content with a device over a network comprises at least one of:
   sharing with another multimedia device associated with a person that is different than the user;
   sharing with a user device of the person;
   sharing with the user device of the person via a user device of the user;
   sharing with the user device of the user; or
   sharing with a social media account of the user.

7. The method of claim 1, wherein said capturing by the media capture device of the first media clip is performed proactively via capture buffering of real-time video, and includes providing the first media clip to the multimedia device; or
   wherein said capturing by the media capture device of the first media clip is performed reactively based on a received command at the media capture device, and includes providing the first media clip to the multimedia device.

8. A system comprising:
   a multimedia device that includes a memory storing program instructions for generating combined media content, and that includes one or more processors configured to execute the program instructions, which when executed, cause the multimedia device to:
   continuously during operation of a source device:
      receive a media content stream from the source device;
      buffer a most recent portion of the media content stream; and
      provide the media content stream to a sink device configured to playback the media content stream to a user of the multimedia device;
   receive one or more messages from a media capture device associated with a capture, by the media capture device, of a first media clip;
   based on the one or more messages, identify a portion of the most recent portion of the media content stream that is buffered, and extract the portion therefrom to generate a second media clip;
   generate the combined media content by combining first media content of the first media clip and second media content of the second media clip; and
   share the combined media content with a device over a network.

9. The system of claim 8, wherein the multimedia device comprises a switching device, and
   wherein the media capture device is associated with the user and is at least one of a smart phone, a camera that includes a microphone and that includes artificial intelligence programming configured to determine at least one of a reaction or an emotion of one or more persons in its field of view, or a stand-alone camera with a microphone.

10. The system of claim 8, wherein the one or more messages, and the first media clip, are received from the media capture device by the multimedia device via an external network with respect to the multimedia device.

11. The system of claim 8, wherein the one or more messages include temporal information associated with the first media clip; and
   wherein the program instructions, when executed, cause the multimedia device, for said identify the portion of the buffered most recent portion of the media content stream, to:

identify based at least on the temporal information; and
align a beginning and a duration of the portion with a corresponding beginning and a duration of the first media clip with respect to absolute time.

12. The system of claim 8, wherein the program instructions, when executed, cause the multimedia device, for said combine the first media clip and the second media clip, to:
overlay an area of one of the first media clip or the second media clip with the other one of the first media clip or the second media clip; or
stitch the first media clip and the second media clip.

13. The system of claim 8, wherein the program instructions, when executed, cause the multimedia device, for said share the combined media content with a device over a network, to perform at least one of:
share with another multimedia device associated with a person that is different than the user;
share with a user device of the person;
share with the user device of the person via a user device of the user;
share with the user device of the user; or
share with a social media account of the user.

14. The system of claim 8, wherein said capture by the media capture device of the first media clip is performed proactively via capture buffering of real-time video, and includes providing the first media clip to the multimedia device; or
wherein said capture by the media capture device of the first media clip is performed reactively based on a received command at the media capture device, and includes providing the first media clip to the multimedia device.

15. A computer-readable storage medium having program instructions recorded thereon that, when executed by a processing device, perform a method, for generating combined media content, that comprises:
continuously performing by a multimedia device:
receiving a media content stream from a source device;
buffering a most recent portion of the media content stream; and
providing the media content stream to a sink device configured to playback the media content stream to a user of the multimedia device;
receiving one or more messages from a media capture device associated with a capturing, by the media capture device, of a first media clip;
based on the one or more messages, identifying a portion of the most recent portion of the media content stream that is buffered, and extracting the portion therefrom, generating a second media clip;
generating the combined media content by combining first media content of the first media clip and second media content of the second media clip; and
sharing the combined media content with a device over a network.

16. The computer-readable storage medium of claim 15, wherein the multimedia device comprises a switching device, and
wherein the media capture device is associated with the user and is at least one of a smart phone, a camera that includes a microphone and that includes artificial intelligence programming configured to determine at least one of a reaction or an emotion of one or more persons in its field of view, or a stand-alone camera with a microphone.

17. The computer-readable storage medium of claim 15, wherein for the method, the one or more messages, and the first media clip, are received from the media capture device by the multimedia device via an external network with respect to the multimedia device.

18. The computer-readable storage medium of claim 15, wherein the one or more messages include temporal information associated with the first media clip; and
wherein, for the method, said identifying the portion of the buffered most recent portion of the media content stream is based at least on the temporal information and includes aligning a beginning and a duration of the portion with a corresponding beginning and a duration of the first media clip with respect to absolute time.

19. The computer-readable storage medium of claim 15, wherein for the method, said combining the first media clip and the second media clip includes:
overlaying an area of one of the first media clip or the second media clip with the other one of the first media clip or the second media clip; or
stitching the first media clip and the second media clip.

20. The computer-readable storage medium of claim 15, wherein the said sharing the combined media content with a device over a network comprises at least one of:
sharing with another multimedia device associated with a person that is different than the user;
sharing with a user device of the person;
sharing with the user device of the person via a user device of the user;
sharing with the user device of the user; or
sharing with a social media account of the user.

* * * * *